United States Patent
Nagayama et al.

(10) Patent No.: US 11,450,853 B2
(45) Date of Patent: Sep. 20, 2022

(54) CARBON MATERIAL FOR NEGATIVE ELECTRODE OF NON-AQUEOUS SECONDARY BATTERY, NEGATIVE ELECTRODE FOR NON-AQUEOUS SECONDARY BATTERY, AND NON-AQUEOUS SECONDARY BATTERY

(71) Applicant: Mitsubishi Chemical Corporation, Chiyoda-ku (JP)

(72) Inventors: Daigo Nagayama, Inashiki-gun (JP); Tooru Fuse, Sakaide (JP); Hisako Kondo, Yokohama (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 34 days.

(21) Appl. No.: 15/166,914

(22) Filed: May 27, 2016

(65) Prior Publication Data

US 2016/0276668 A1    Sep. 22, 2016

Related U.S. Application Data

(63) Continuation of application No. PCT/JP2014/081383, filed on Nov. 27, 2014.

(30) Foreign Application Priority Data

Nov. 27, 2013 (JP) .............................. JP2013-244751

(51) Int. Cl.
*H01M 4/587* (2010.01)
*H01M 4/38* (2006.01)
(Continued)

(52) U.S. Cl.
CPC ............ *H01M 4/587* (2013.01); *H01M 4/13* (2013.01); *H01M 4/133* (2013.01); *H01M 4/362* (2013.01);
(Continued)

(58) Field of Classification Search
CPC ........ H01M 4/587; H01M 4/13; H01M 4/133; H01M 4/362; H01M 4/364; H01M 4/386; H01M 4/383
See application file for complete search history.

(56) References Cited

U.S. PATENT DOCUMENTS 7,897,283 B2 * 3/2011 Matsumoto ........... C04B 35/522
                                                      252/182.1
2003/0215711 A1   11/2003 Aramata et al.
(Continued)

FOREIGN PATENT DOCUMENTS

CN       1513922 A       7/2004
CN     101449410 A       6/2009
(Continued)

OTHER PUBLICATIONS

Extended European Search Report dated Nov. 7, 2016 in Patent Application No. 14865115.1.
(Continued)

*Primary Examiner* — Helen Oi K Conley
(74) *Attorney, Agent, or Firm* — Oblon, McClelland, Maier & Neustadt, L.L.P.

(57) ABSTRACT

An object of the present invention is to provide a carbon material for negative electrodes of non-aqueous secondary batteries having a high capacity, a high output, excellent cycle characteristics and a low irreversible capacity.
The present invention relates to a carbon material for negative electrodes of non-aqueous secondary batteries, the carbon material comprising: (1) a composite carbon particles (A) containing elemental silicon, and (2) amorphous composite graphite particles (B) in which graphite particles (C) and amorphous carbon are composited.

47 Claims, 1 Drawing Sheet

(51) Int. Cl.
  *H01M 4/13*      (2010.01)
  *H01M 4/36*      (2006.01)
  *H01M 4/48*      (2010.01)
  *H01M 4/133*     (2010.01)
  *H01M 10/0525*   (2010.01)
  *H01M 4/02*      (2006.01)

(52) U.S. Cl.
  CPC ........... *H01M 4/364* (2013.01); *H01M 4/386* (2013.01); *H01M 4/483* (2013.01); *H01M 10/0525* (2013.01); *H01M 2004/027* (2013.01)

(56) References Cited

U.S. PATENT DOCUMENTS

| | | | |
|---|---|---|---|
| 2006/0166098 | A1 | 7/2006 | Tabuchi et al. |
| 2009/0311606 | A1 | 12/2009 | Fukuoka et al. |
| 2010/0273058 | A1 | 10/2010 | Lee et al. |
| 2012/0021286 | A1 | 1/2012 | Tabuchi et al. |
| 2012/0052393 | A1 | 3/2012 | Kameda et al. |
| 2012/0064403 | A1* | 3/2012 | Kameda ............... H01M 4/133 429/211 |
| 2012/0326079 | A1* | 12/2012 | Kim ................ H01M 4/0471 252/182.1 |
| 2013/0040203 | A1* | 2/2013 | Yoon ................ H01M 10/052 429/231.8 |
| 2013/0136988 | A1 | 5/2013 | Tanaka et al. |
| 2013/0177813 | A1 | 7/2013 | Kim et al. |
| 2014/0093780 | A1 | 4/2014 | Tabuchi et al. |
| 2016/0036052 | A1 | 2/2016 | Tabuchi et al. |

FOREIGN PATENT DOCUMENTS

| | | | | |
|---|---|---|---|---|
| CN | 101609879 | A | | 12/2009 |
| CN | 102362381 | A | | 2/2012 |
| CN | 102709566 | A | | 10/2012 |
| CN | 102893430 | A | | 1/2013 |
| EP | 2 613 382 | A2 | | 7/2013 |
| JP | 11-135106 | | | 5/1999 |
| JP | 2000-203818 | | | 7/2000 |
| JP | 2002-231225 | | | 8/2002 |
| JP | 2003-223892 | | | 8/2003 |
| JP | 2003-331832 | | | 11/2003 |
| JP | 2005-243508 | | | 9/2005 |
| JP | 2005-294011 | | | 10/2005 |
| JP | 2009-535776 | | | 10/2009 |
| JP | 2010-92649 | A | | 4/2010 |
| JP | 2010-251315 | | | 11/2010 |
| JP | 2012-43546 | A | | 3/2012 |
| JP | 2012-124114 | | | 6/2012 |
| JP | 2015-26579 | | | 2/2015 |
| JP | 2016-143555 | | * | 2/2015 ............. H01M 4/62 |
| KR | 10-2012-0003442 | | | 1/2012 |
| WO | WO 2012/018035 | A1 | | 2/2012 |
| WO | WO-2013183530 | A1 | * | 12/2013 ............. H01M 4/366 |

OTHER PUBLICATIONS

International Search report dated Mar. 17, 2015 in PCT/JP2014/081383, filed on Nov. 27, 2014.
Office Action dated May 29, 2018 in Japanese Patent Application No. 2015-550990 (with English language translation).
Combined Chinese Office Action and Search Report dated Mar. 30, 2018 in Patent Application No. 201480065097.2 (with English language translation), citing documents AO-AU therein, 19 pages.
Office action dated Mar. 27, 2019 in the counterpart Chinese patent application No. 201480065097.2 w/English machine translation thereof.
Chinese Office Action dated Jul. 31, 2020 in Chinese Patent Application No. 201480065097.2 (with English translation), 18 pages.
Office Action as received in the Korean patent application No. 10-2016-706702 dated May 4, 2021 w/English Translation, citing document AW, 11 pages.
Korean Office Action dated Mar. 17, 2022 in corresponding Korean Patent Application No. 10-2022-7003225 w/Machine English Translation.
Chinese Office Action dated Dec. 3, 2019, in Patent Application No. 201480065097.2, 17 pages (with English translation).
Office Action dated Dec. 8, 2021 in Korean Patent Application No. 10-2016-7016702 filed Nov. 27, 2014 w/English translation.
Chinese Office Action dated Mar. 16, 2021 in Chinese Patent Application No. 201480065097.2 (with English translation), 32 pages.
Office Action dated Oct. 29, 2021 in Korean Patent Application No. 10-2016-7016702 filed Nov. 27, 2014 w/English translation.

* cited by examiner

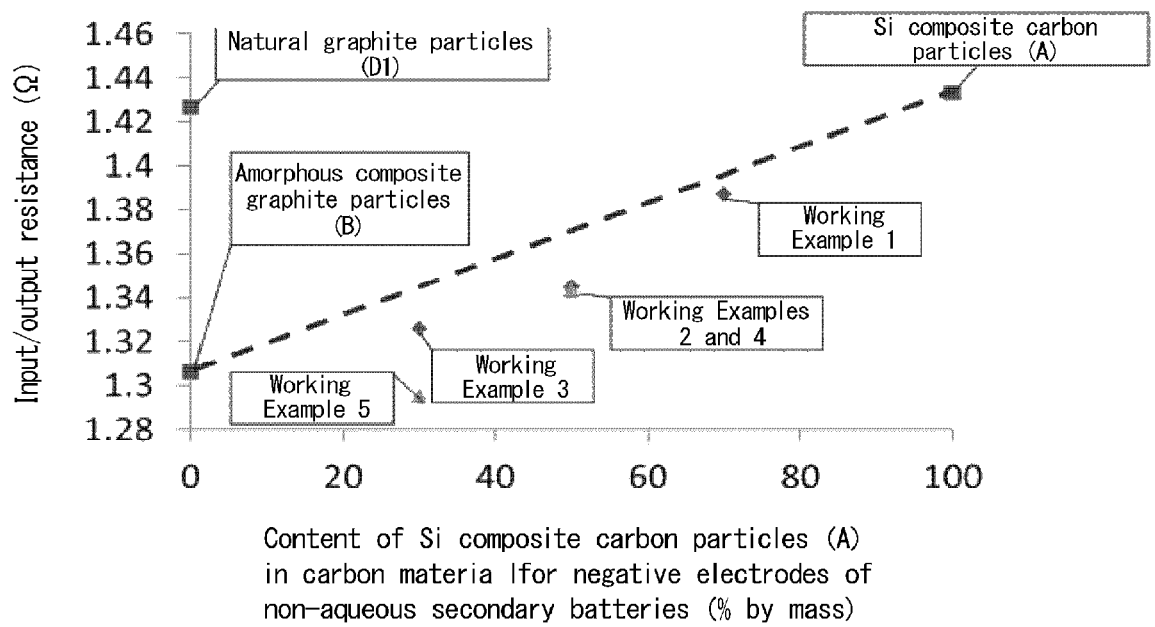

CARBON MATERIAL FOR NEGATIVE ELECTRODE OF NON-AQUEOUS SECONDARY BATTERY, NEGATIVE ELECTRODE FOR NON-AQUEOUS SECONDARY BATTERY, AND NON-AQUEOUS SECONDARY BATTERY

TECHNICAL FIELD

The present invention relates to a carbon material for negative electrodes of non-aqueous secondary batteries, and a negative electrode formed by using the carbon material, and a non-aqueous secondary battery comprising the negative electrode.

BACKGROUND ART

Non-aqueous secondary batteries having a positive electrode and a negative electrode that can occlude and release lithium ions, and a non-aqueous electrolytic solution formed by dissolving a lithium salt, such as $LiPF_6$ and $LiBF_4$, have been developed and practically used.

Various substances have been proposed as negative electrode materials for these batteries; for example, from the perspectives of achieving a high capacity and excellent flatness of discharge potential, natural graphite, artificial graphite obtained by graphitization of cokes or the like, and graphite carbon materials, such as graphitized mesophase pitch and graphitized carbon fibers, have been used as the negative electrode materials.

Meanwhile, recently, new applications of non-aqueous secondary batteries, especially lithium ion secondary batteries, have been developed, and applications, such as for electric tools and electric vehicles, have been developed in addition to conventional applications such as for laptop computers, mobile communication devices, portable cameras, and portable game consoles. As a result, lithium ion secondary batteries having rapid charge/discharge characteristics that are better than those of conventional lithium ion secondary batteries and also having a high capacity and high cycle characteristics have been desired.

Therefore, to increase filling rate of carbon materials in an electrode plate to enhance discharge capacity, carbon materials obtained by mixing graphite particles having different properties have been used.

However, although a high capacity has been desired as described above, since the theoretical capacity of carbon is 372 mAh, it is not possible to expect a higher capacity, which is higher than the theoretical capacity, with a negative electrode mainly using carbon. Therefore, applications of various substances having a high theoretical capacity, in particular metal particles, to negative electrodes have been researched.

For example, Patent Literature 1 proposes a method of producing Si composite carbon particles by calcining a mixture of fine powder of Si compound, graphite, pitch which is a carbonaceous material precursor, and the like.

Furthermore, Patent Literature 2 proposes use of two types of materials (metal oxide and carbon material) by mixing them, each having equilibrium potential that differs from the equilibrium potential of the other, that undergo respective electrochemical reduction reactions as active materials.

Furthermore, Patent Literatures 3 and 4 propose non-aqueous secondary batteries comprising Si composite carbon particles, which are formed from a Si compound and graphite powder, and graphite particles. Therefore, these documents report that a non-aqueous secondary battery having a high capacity and excellent cycle characteristics can be provided.

PRIOR ART DOCUMENTS

Patent Literatures

Patent Literature 1: Japanese Patent Application Kokai Publication No. 2003-223892 (unexamined, published Japanese patent application)

Patent Literature 2: Japanese Patent Application Kokai Publication No. H11-135106 (unexamined, published Japanese patent application)

Patent Literature 3: Japanese Patent Application Kokai Publication No. 2012-124114 (unexamined, published Japanese patent application)

Patent Literature 4: WO2012/018035

SUMMARY OF THE INVENTION

Problems to be Solved by the Invention

However, according to the research of the inventors of the present invention, although technology described in Patent Literature 1 is Si composite carbon particles obtained by compositing graphite and Si compound fine powder with carbonaceous material formed from carbon, the Si composite carbon particles have a problem in that sufficient cycle characteristics cannot be obtained since the particles are easily separated at the point of contact between the particles due to expansion and contraction during charging and discharging. Furthermore, with Si composite carbon particles, lithium transfer is hindered due to difference in bonding properties during charging and discharging and/or due to decrease in electrical conductivity within or outside of the particles involved with expansion. As a result, the Si composite carbon particles have not yet reached a practical level for non-aqueous secondary batteries since a problem exists in that sufficient performance (output characteristics) cannot be obtained during high-speed charging and discharging.

Meanwhile, Patent Literature 2 describes that a non-aqueous secondary battery that can prevent structural failure of metal oxide in advance and that has a high capacity and excellent cycle characteristics can be obtained by mixing metal oxide, which is capable of occluding and releasing lithium, with a carbon material according to the technology described in this document. However, since the metal oxide is not a composite particle with carbon, breakage of an electrode due to expansion of the metal oxide cannot be suppressed, and the carbon material is not specifically stipulated. Therefore, for the technology of Patent Literature 2, further improvements need to be made to obtain a battery having high cycle characteristics that are required nowadays.

Furthermore, Patent Literatures 3 and 4 describe that, by mixing Si composite carbon particles and graphite particles, cycle characteristics can be enhanced and expansion of the battery can be suppressed according to the technologies described in these documents. However, mobility of lithium in the entire active material is low, and non-aqueous secondary batteries obtained by the technologies described in Patent Literatures 3 and 4 have problems in charge/discharge characteristics when charging and discharging are performed rapidly.

An object of the present invention is to solve the problems of the conventional technologies described above, and to provide a carbon material for negative electrodes of non-aqueous secondary batteries having a high capacity, a high output, excellent cycle characteristics, and a low irreversible capacity, a negative electrode for non-aqueous secondary batteries obtained by using the carbon material, and a non-aqueous secondary battery having the negative electrode.

Means for Solving the Problems

As a result of diligent research to solve the above problems, the inventors of the present invention have found that a non-aqueous secondary battery having a high capacity, a high output, excellent cycle characteristics, and a low reduction in irreversible capacity can be produced by using a carbon material for negative electrodes of non-aqueous secondary batteries, in which (1) composite carbon particles (A) containing elemental silicon (hereinafter, also referred to as "Si composite carbon particles (A)"), and (2) amorphous composite graphite particles (B) in which graphite particles (C) and amorphous carbon are composited (hereinafter, also referred to as "amorphous composite graphite particles (B)") are mixed.

Although the mechanism of achieving excellent battery characteristics exhibited by the carbon material for negative electrodes of non-aqueous secondary batteries of the present invention is not clarified, it is assumed that the mechanism can be described as below.

The Si composite carbon particles (A) exhibit a high capacity due to the contained elemental silicon, and excellent cycle characteristics since the volume expansion of the elemental silicon during charging and discharging can be moderated by compositing with carbon particles. On the other hand, the elemental silicon has a problem in that the sufficient performance cannot be obtained when charging and discharging are performed rapidly because lithium transfer is hindered by the difference in bonding properties during charging and discharging and by the decrease in electrical conductivity within or outside of the particles involved with expansion. However, in the present invention, it is conceived that the problem can be solved by mixing with amorphous composite graphite particles (B).

That is, since the amorphous composite graphite particles (B) have excellent electrical conductivity and mobility of lithium in the particle, increase of resistance can be suppressed even when charging and discharging are performed rapidly. It is conceived that, with the negative electrode comprising the active material layer containing the Si composite carbon particles (A) and the amorphous composite graphite particles (B), high input/output can be maintained by suppressing increase in overvoltage in the entire electrode since the lithium transfer preferentially occurs in the amorphous composite graphite particles (B), in which transfer of lithium ion is even more facilitated during high-speed charging and discharging. Therefore, a non-aqueous secondary battery having a high capacity and a high output can be obtained.

Furthermore, it is conceived that excellent cycle characteristics of non-aqueous secondary batteries given by a carbon material for negative electrodes can be attributed to the negative electrode material containing the Si composite carbon particles (A) and the amorphous composite graphite particles (B), which is a relatively hard material and suppresses deformation of the particles when being pressed during the negative electrode production, and thus can secure high capacity and the flow path of the electrolytic solution.

Furthermore, a more preferable aspect of the present invention is further compounding relatively flexible natural graphite particles (D) to the carbon material for negative electrodes of non-aqueous secondary batteries. It is conceived that the natural graphite particles (D) can be appropriately deformed when being pressed during the negative electrode production, thereby enhancing the contact between the particles, making it possible to suppress breakage of conductive path during charging and discharging of the battery, and suppressing decrease in the irreversible capacity. Furthermore, it is conceived that, by adding the natural graphite particles (D), side reactions with the non-aqueous electrolytic solution can be suppressed because the electrode can be rolled with a smaller force and thus the breakage of the active material can be suppressed.

It is conceived that the carbon material for negative electrodes of non-aqueous secondary batteries having a high capacity, excellent cycle characteristics, and a low decrease in irreversible capacity can be obtained from the reasons described above.

That is, the gist of the present invention is
a carbon material for negative electrodes of non-aqueous secondary batteries, the carbon material comprising:
(1) composite carbon particles (A) containing elemental silicon, and
(2) amorphous composite graphite particles (B) in which graphite particles (C) and amorphous carbon are composited.

Furthermore, another gist of the present invention is a negative electrode for non-aqueous secondary batteries formed by using the carbon material for negative electrodes of non-aqueous secondary batteries described above.

Furthermore, yet another gist of the present invention is a non-aqueous secondary battery comprising: a positive electrode and a negative electrode, and an electrolyte, the negative electrode being the negative electrode for non-aqueous secondary batteries described above.

Effect of the Invention

According to the present invention, a carbon material for negative electrodes of non-aqueous secondary batteries having excellent stability, a high capacity, a high output, a small irreversible capacity, and excellent cycle characteristics, and a non-aqueous secondary battery using the same can be provided.

BRIEF DESCRIPTION OF THE DRAWINGS

FIG. 1 is a figure showing the relationship between the content of the Si composite carbon particles (A) in the carbon material for negative electrodes of non-aqueous secondary batteries and the input/output resistance. In terms of the coordinate ("content of Si composite carbon particles (A)", "input/output resistance"), Working Example 1 is a point of (70, 1.39), Working Example 2 is a point of (50, 1.34), Working Example 3 is a point of (30, 1.33), Working Example 4 is a point of (50, 1.34), Working Example 5 is a point of (30, 1.30), Comparative Example 1 (Si composite carbon particles (A)) is a point of (100,1.43), Comparative Example 2 (amorphous composite graphite particles (B)) is a point of (0, 1.31), and Comparative Example 3 (natural graphite particles (D1)) is a point of (0, 1.43).

DETAILED DESCRIPTION OF THE INVENTION

The details of the present invention will be described below. Note that the explanation of the structure of the present invention described below is an example (representative example) of an embodiment of the present invention, and the present invention is not limited to these embodiments provided that the gist of the present invention is not exceeded.

The carbon material for negative electrodes of non-aqueous secondary batteries of the present invention (hereinafter, also simply referred to as "carbon material of the present invention") contains Si composite carbon particles (A) and amorphous composite graphite particles (B). The Si composite carbon particles (A) and the amorphous composite graphite particles (B) used in the present invention will be described below.

Si Composite Carbon Particles (A)

The Si composite carbon particles (A) of the present invention will be described below.

The Si composite carbon particle (A) is not particularly limited as long as the Si composite carbon particle (A) is a particle containing at least a substance having elemental silicon and a carbon particle, and conventional raw material can be used. For example, Si composite carbon particles disclosed in Japanese Patent Application Kokai Publication No. 2012-043546 (published Japanese patent application), Japanese Patent Application Kokai Publication No. 2005-243508, Japanese Patent Application Kokai Publication No. 2008-027897, Japanese Patent Application Kokai Publication No. 2008-186732, and the like can be used in the present invention. The Si composite carbon particles (A) that further enhance the effect of the present invention will be described below.

Properties of the Si Composite Carbon Particles (A)

The Si composite carbon particles (A) preferably have the following properties.

(a) Volume-Based Average Particle Diameter (d50) of Si Composite Carbon Particles (A)

The volume-based average particle diameter (d50) of the Si composite carbon particles (A) (hereinafter, also referred to as "average particle diameter d50") is typically 1 μm or greater, preferably 4 μm or greater, and more preferably 7 μm or greater, but typically 50 μm or less, preferably 40 μm or less, more preferably 30 μm or less, and even more preferably 25 μm or less. When the average particle diameter d50 is too large, since the total number of the particles becomes small and the proportion of the Si composite carbon particles (A) present in the carbon material of the present invention is lowered, the effect of compounding amorphous composite graphite particles (B) and/or the natural graphite particles (D), described below, is less likely to be achieved. On the other hand, when the average particle diameter d50 is too small, since decomposition of the electrolytic solution is increased due to increased specific surface area, initial efficiency of the non-aqueous secondary battery obtained by using the carbon material of the present invention (hereinafter, also referred to as "non-aqueous secondary battery" or "battery") tends to be lowered.

Note that the method of measuring the average particle diameter d50 is as described below. To 10 mL of 0.2% by mass aqueous solution of polyoxyethylene sorbitan monolaurate which is a surfactant, 0.01 g of sample is suspended and then it is introduced to a commercially available laser diffraction/scattering particle size distribution measuring device and irradiated with ultrasonic wave of 28 kHz at an output of 60 W for 1 minute. Thereafter, the value measured as a volume-based median diameter using the measurement device is defined as the volume-based average particle diameter (d50) in the present invention.

(b) Aspect Ratio of Si Composite Carbon Particles (A)

The aspect ratio of the Si composite carbon particles (A) is typically 1 or greater, preferably 1.3 or greater, more preferably 1.4 or greater, and even more preferably 1.5 or greater, but typically 4 or less, preferably 3 or less, more preferably 2.5 or less, and even more preferably 2 or less.

When the aspect ratio is too large, since the particles tend to be arranged in the parallel direction relative to the current collector when formed into an electrode, continuous voids in the thickness direction of the electrode are not sufficiently ensured, and thus lithium ion mobility in the thickness direction is lowered and rapid charge/discharge characteristics of the non-aqueous secondary battery are likely to be lowered. The aspect ratio can be measured by polishing an embedded resin or electrode plate of the particles perpendicularly to a flat plate, taking a photo of the cross section thereof, measuring the major-axis length (parallel direction relative to the flat plate) and the minor-axis length (perpendicular direction relative to the flat plate) of the particle by image analysis by randomly extracting 50 or more particles, and then calculating the average of the major-axis length/minor-axis length. Since the particles that are embedded in a resin or formed into an electrode plate tend to be arranged in a manner that the thickness directions of the particles are typically aligned perpendicularly to the flat plate, the major-axis lengths and the minor-axis lengths that are characteristic to the particles can be obtained by the method described above.

(c) Roundness of Si Composite Carbon Particles (A)

The roundness of the Si composite carbon particles (A) is typically 0.85 or greater, preferably 0.88 or greater, more preferably 0.89 or greater, and even more preferably 0.90 or greater. Furthermore, the roundness is typically 1 or less, preferably 0.99 or less, more preferably 0.98 or less, and even more preferably 0.97 or less. Note that spherical shapes in the present description can be expressed in terms of the range of the roundness described above.

When the roundness is too small, since the particles tend to be arranged in the parallel direction relative to the current collector when formed into an electrode, continuous voids in the thickness direction of the electrode are not sufficiently ensured, and thus lithium ion mobility in the thickness direction is lowered and rapid charge/discharge characteristics of the non-aqueous secondary battery are likely to be lowered. When the roundness is too large, lowering of the effect of suppressing breakage of conductive path and lowering of cycle characteristics tend to be caused.

Note that the roundness is defined by the following formula (1) in the present invention, and the roundness of 1 indicates an ideal sphere.

$$\text{Roundness} = \frac{\text{circumference of a corresponding circle having the same area as that of projected shape of the particle}}{\text{actual circumference of the projected shape of the particle}} \quad \text{Formula (1)}$$

The value of the roundness is determined by calculating the roundness of an equivalent circle diameter using polyoxyethylene (20) monolaurate as a surfactant and ion-exchanged water as a dispersion medium by using a flow type particle image analyzer (e.g., FPIA, manufactured by Sysmex Corporation). "Equivalent circle diameter" is a diameter of a circle (equivalent circle) having the same area as the projected area of the photographed particle image. "Roundness" is a proportion obtained by using a circumference of the equivalent circle as the numerator and a circumference of the photographed projected image of the particle as the denominator. The roundness in the present invention is determined by averaging the roundness of the particles having the measured equivalent diameters in the range of 10 to 40 μm.

(d) Spacing Between Planes ($d_{002}$) and Crystallite Size (Lc) of Si Composite Carbon Particles (A)

The spacing between planes ($d_{002}$) of the 002 plane by wide-angle X-ray diffraction of the Si composite carbon particles (A) is typically 0.337 nm or less, and preferably 0.336 m or less. When the d value is too large, crystallinity is lowered and the discharge capacity of the non-aqueous secondary battery tends to be lowered. On the other hand, the lower limit thereof is 0.3354 nm, which is the theoretical value of graphite.

Furthermore, crystallite size (Lc) of the Si composite carbon particles (A) is in the range of typically 30 nm or greater, preferably 50 nm or greater, and more preferably 100 nm or greater. When the crystallite size is less than this range, crystallinity is lowered, and the discharge capacity of the battery tends to be lowered.

(e) Raman R Value of Si Composite Carbon Particles (A)

The Raman R value of the Si composite carbon particles (A) is defined by measuring the intensity $I_A$ of the maximum peak $P_A$ around 1580 cm$^{-1}$ and the intensity $I_B$ of the maximum peak $P_B$ around 1360 cm$^{-1}$ from a Raman spectrum of the Si composite carbon particles (A), and then calculating the intensity ratio R ($R=I_B/I_A$) thereof. The value is typically 1 or less, preferably 0.8 or less, more preferably 0.6 or less, and even more preferably 0.5 or less, but typically 0.05 or greater, preferably 0.1 or greater, more preferably 0.2 or greater, and even more preferably 0.25 or greater. When the Raman R value is less than this range, crystallinity of the particle surface becomes too high and the number of sites for inserting Li decreases, and rapid charge/discharge characteristics of the non-aqueous secondary battery are likely to be lowered. On the other hand, when the Raman R value is greater than this range, crystallinity of the particle surface is disordered and reactivity to the electrolytic solution increases, and thus lowering in charge/discharge efficiency and increase in generation of gas tend to be caused.

The Raman spectrum can be measured by a Raman spectrometer. Specifically, a sample is filled by dropping particles which are the measurement target, into a measurement cell by gravity, and then the measurement is performed by irradiating the measurement cell with an argon-ion laser beam while the measurement cell is being rotated within the plane perpendicular to this laser beam.

Wavelength of argon-ion laser beam: 514.5 nm
Laser power on sample: 25 mW
Optical resolution: 4 cm$^{-1}$
Measured range: 1100 cm$^{-1}$ to 1730 cm$^{-1}$
Peak intensity measurement, peak half width measurement: background process, smoothing process (convolution by simple average: 5 points)

(f) Amount of Surface Functional Groups of Si Composite Carbon Particles (A)

In the Si composite carbon particles (A), the O/C value of the amount of the surface functional groups expressed by the following formula (2) is typically 0.1% or greater, preferably 1% or greater, and more preferably 2% or greater, but typically 30% or less, preferably 20% or less, and more preferably 15% or less. When this O/C value of the amount of the surface functional groups is too small, desolvation reactivity of Li ions and the electrolytic solution solvent on the surface of the negative electrode active material are lowered, and the large current charge/discharge characteristics of the non-aqueous secondary battery tends to be lowered. When the O/C value is too large, the reactivity with the electrolytic solution increases, and lowering of the charge/discharge efficiency tends to occur.

O/C value (%)={(O atom concentration determined based on the peak area of O1s in the spectrum by X-ray photoelectron spectroscopy (XPS) analysis)/(C atom concentration determined based on the peak area of C1s in the spectrum by XPS analysis)}×100    Formula (2)

The O/C value of the amount of the surface functional groups in the present invention can be measured as described below using the X-ray photoelectron spectroscopy (XPS).

A measurement target is placed on a sample stage in a manner that the surface thereof is flat, and then a spectrum of C1s (280 to 300 eV) and O1s (525 to 545 eV) is measured by multiplex measurement using Kα line of aluminum as an X-ray source using an X-ray photoelectron spectrometer. The obtained peak top of C1s is subjected to static charge correction, taking the peak top as 284.3 eV. Thereafter, the peak areas of C1s and O1s in the spectrum are determined, and the sensitivity coefficient of the device is multiplied thereto to calculate each of the surface atom concentration of C and O. A ratio O/C (O atom concentration/C atom concentration) of the obtained atom concentrations of O and C shown in percentage is defined as the amount of the surface functional groups of the sample (Si composite carbon particles (A)).

(g) BET Specific Surface Area (SA) of Si Composite Carbon Particles (A)

The specific surface area of the Si composite carbon particles (A) measured by the BET method is typically 0.1 m$^2$/g or greater, preferably 0.7 m$^2$/g or greater, and more preferably 1 m$^2$/g or greater. Furthermore, the specific surface area is typically 40 m$^2$/g or less, preferably 30 m$^2$/g or less, more preferably 20 m$^2$/g or less, even more preferably 18 m$^2$/g or less, and particularly preferably 17 m$^2$/g or less.

When the specific surface area is too small, the number of the sites where lithium ions move in and out becomes small, thereby making high-speed charge/discharge characteristics and output characteristics poor. On the other hand, when the specific surface area is too large, the active material becomes too active to the electrolytic solution and the initial irreversible capacity becomes large, and thus a non-aqueous secondary battery having a high capacity is less likely to be produced.

Note that the BET specific surface area is measured by the single point BET method via a nitrogen gas adsorption-flow method using a specific surface area measurement device.

(h) Tap Density of Si Composite Carbon Particles (A)

The tap density of the Si composite carbon particles (A) is typically 0.5 g/cm$^3$ or greater, preferably 0.6 g/cm$^3$ or greater, more preferably 0.8 g/cm$^3$ or greater, even more preferably 0.85 g/cm$^3$ or greater, and particularly preferably 0.9 g/cm$^3$ or greater, but typically 1.3 g/cm$^3$ or less, preferably 1.2 g/cm$^3$ or less, and more preferably 1.1 g/cm$^3$ or less. When the tap density is too low, high-speed charge/discharge characteristics of the non-aqueous secondary battery become poor. When the tap density is too high, cycle characteristics may be lowered due to breakage of conductive path caused by reduced contact between the particles.

In the present invention, the tap density is defined as a density determined using a powder density measurement device, by dropping a sample (Si composite carbon particles (A)) into a cylindrical tap cell having a diameter of 1.6 cm and a volume of 20 cm$^3$ through a sieve having a sieve opening of 300 μm to fully fill the cell, then performing 1000 times of tapping with a stroke length of 10 mm, and measuring the volume and the weight of the sample to determine the density.

(i) DBP Oil Absorption of Si Composite Carbon Particles (A)

The dibutyl phthalate (DBP) oil absorption of the Si composite carbon particles (A) is typically 65 mL/100 g or less, preferably 62 mL/100 g or less, more preferably 60 mL/100 g or less, and even more preferably 57 mL/100 g or less. Furthermore, the DBP oil absorption is typically 30 mL/100 g or greater, preferably 40 mL/100 g or greater, and more preferably 50 m/100 g or greater. When the DBP oil absorption is too large, streak or the like during coating of a slurry containing the carbon material of the present invention tends to be caused when a negative electrode is formed. When the DBP oil absorption is too small, the particles may not have pore structures, and thus reaction surface tends to be smaller.

Note that the DBP oil absorption in the present invention is defined by a value measured by placing 40 g of material to be measured, and using the following conditions: dropping rate of 4 mL/min, rotation speed of 125 rpm, and set torque of 500 N·m, in accordance with JIS K6217. For the measurement, an absorption measurement device (S-500) manufactured by Asahisouken Co., Ltd. or the like can be used.

(j) Form of Elemental Silicon in Si Composite Carbon Particles (A)

Examples of the form of the elemental silicon contained in the Si composite carbon particles (A) in the present invention include Si, $SiO_x$, $SiN_x$, $SiC_x$, $SiZ_xO_y$ (Z=C, N), and the like, and these are collectively referred to as "Si compound" in the present invention. Among these, from the perspective of capacity of the non-aqueous secondary battery, Si and $SiO_x$ are preferable. The compound of the general formula $SiO_x$ is obtained by using Si dioxide ($SiO_2$) and metal Si (Si) as raw materials; however, the value of x thereof is typically $0<x<2$, preferably 0.2 to 1.8, more preferably 0.4 to 1.6, and even more preferably 0.6 to 1.4. When the value of x is within this range, reduction of irreversible capacity due to bonding between Li and oxygen is made possible while a high capacity of the non-aqueous secondary battery is achieved.

The form of the elemental silicon in the Si composite carbon particles (A) in the present invention is preferably in a form of Si compound particles, in which the Si compound is formed into panicles, from the perspective of capacity of the non-aqueous secondary battery.

Furthermore, the content of the elemental silicon in the Si composite carbon particles (A) in the present invention is typically 0.5% by mass or greater, preferably 1% by mass or greater, more preferably 2% by mass or greater, even more preferably 5% by mass or greater, and particularly preferably 10% by mass or greater, relative to the content of the Si composite carbon particles (A). Furthermore, the content of the elemental silicon is typically 99% by mass or less, preferably 50% by mass or less, more preferably 30% by mass or less, even more preferably 25% by mass or less, and particularly preferably 20% by mass or less. The content within this range is preferable since a non-aqueous secondary battery having a sufficient capacity can be obtained.

Note that the method of measuring the content of the elemental silicon in the Si composite carbon particles (A) is as described below. After a sample is completely dissolved in an alkali, the mixture is dissolved in water to a predetermined volume. Then, the sample is measured using an inductively coupled plasma optical emission spectrometer (ULTIMA2C, manufactured by Horiba, Ltd.) to calculate the amount of the elemental silicon from a calibration curve. Thereafter, by dividing the amount of the elemental silicon by the weight of the Si composite carbon particles (A), the content of the elemental silicon in the Si composite carbon particles (A) can be calculated.

(k) Abundance Ratio of Elemental Silicon in Si Composite Carbon Particles (A)

The abundance ratio of the elemental silicon calculated by the measurement method described below in the Si composite carbon particles (A) used in the present invention is typically 0.2 or greater, preferably 0.3 or greater, more preferably 0.4 or greater, and even more preferably 0.5 or greater, and particularly preferably 0.6 or greater, but typically 1.5 or less, preferably 1.2 or less, and more preferably 1.0 or less. When this numerical value is higher, the number of elemental silicon present within the Si composite carbon particles (A) tends to be greater compared to the number of elemental silicon present outside the Si composite carbon particles (A), and reduction in charge/discharge efficiency due to breakage of conductive path between the particles tends to be suppressed when a negative electrode is formed.

The abundance ratio of the elemental silicon in the Si composite carbon particles (A) is calculated as described below. First, a coated film of the Si composite carbon particles (A) or a thin piece of resin, which is obtained by embedding the Si composite carbon particles (A) into a resin or the like, is produced. After a particle cross section is cut out using a focused ion beam (FIB) and/or ion milling, observation is performed by an observation method such as observation of particle cross section using a scanning electron microscope (SEM).

Typically, the accelerating voltage for observing the cross section of one particle of the Si composite carbon particles (A) using a scanning electron microscope (SEM) is preferably 1 kV or greater, more preferably 2 kV or greater, and even more preferably 3 kV or greater, but typically 10 kV or less, more preferably 8 kV or less, and even more preferably 5 kV or less. When the accelerating voltage is within this range, identification between graphite particles and Si compounds is facilitated due to the difference of the backscattered secondary-electron image in the SEM image. Furthermore, imaging magnification is typically 500 times or greater, more preferably 1000 times or greater, and even more preferably 2000 times or greater, but typically 10000 times or less. When the imaging magnification is within the range described above, an entire image of one particle of the Si composite carbon particles (A) can be obtained. Resolution is 200 dpi (ppi) or greater, and preferably 256 dpi (ppi) or greater. Furthermore, evaluation is preferably performed using the pixel number of 800 pixel or greater. Next, while the image is observed, identification of graphite and elemental silicon is performed using energy dispersive X-ray spectroscopy (EDX) and wavelength dispersive X-ray spectroscopy (WDX).

Among the obtained images, one particle of the Si composite carbon particles (A) is extracted, and the area (a) of the Si compound within the particle is calculated. Then, the extracted one particle and the background, which is the portion other than the one particle, are binarized. Thereafter, contraction processing is repeatedly performed on the particle to extract a shape which has an area that is 70% of the area of the extracted one particle. The area (b) in which the elemental silicon is present within the shape is calculated. Note that, when the area, in which the contraction processing has been repeatedly performed, has failed to give a shape having the value of exactly 70%, a shape having a value that is closest to 70% and that is within the range of 70%±3% is taken as the 70% shape in the present invention. The extraction of one particle, area calculation, binarization, and contraction processing described above can be performed by using image processing software for general use. Examples the software include "Image J", "Image-Pro plus", and the like.

The value is then obtained by dividing the area (b) by the area (a), which are calculated as described above, and this measurement was performed for randomly chosen three particles. These values for the three particles are averaged, and the resultant average value is used as the abundance ratio of the elemental silicon in the Si composite carbon particles (A).

Form of Si Composite Carbon Particles (A)

The form of the Si composite carbon particle (A) described above is not particularly limited as long as the Si composite carbon particle (A) is a carbon raw material containing elemental silicon; however, examples thereof include:

(I) a substance in which Si compound particles are dispersed within a granulated body formed from a carbon raw material;

(II) a substance in which Si compound particles are adhered or coated on the periphery of a carbon raw material which serves as a core;

(III) a substance in which the Si compound particles are dispersed within a carbon raw material which has been spheroidized;

(IV) a substance in which a carbonaceous material is adhered or coated on the periphery of the Si compound particle which serves as a core;

(V) a form having a combination of these;
and the like.

(III) A substance in which the Si compound particles are dispersed within a carbon raw material which has been spheroidized is preferable, because a non-aqueous secondary battery tends to exhibit a high capacity and high cycle characteristics by suppressing panicle fracture and breakage of conductive path involved therewith by moderating the stress caused by volume expansion associated with charging and discharging of the Si compound, and because high initial efficiency is likely to be exhibited by preventing a contact with the electrolytic solution to suppress side reactions, as a result of allowing the Si compound particles to be contained within the Si composite carbon particles (A). Furthermore, at this time, at least one particle of the Si compound particles is preferably in contact with the carbon raw material because increase in the irreversible capacity can be suppressed.

Note that, in the present description, "adhered" described above refers to a state where a Si compound panicle is adhered, attached, composited, or the like onto a surface of a carbon material. These states can be checked by observing the particle cross section using techniques such as a field emission scanning electron microscopy-energy dispersive X-ray spectroscopy (SEM-EDX) analysis and X-ray photoelectron spectroscopy (XPS) analysis.

Method of Producing Si Composite Carbon Particles (A)

Raw Materials of Si Composite Carbon Particles (A)

The raw materials of the Si composite carbon particles (A) described above are not particularly limited as long as the Si composite carbon particles (A) are formed. The Si composite carbon particles (A) can be produced by using, for example, a carbon material, Si compound particles, and an organic compound which becomes a carbonaceous material.

Carbon Material

Although the carbon material that is used as a raw material is not particularly limited, when the Si composite carbon particles (A) of (I) or (III) described above are produced, examples thereof include graphite particles of natural graphite, artificial graphite, as well as calcined materials of a raw material selected from the group consisting of coal-based cokes having a lower crystallinity than those of the aforementioned graphite particles, petroleum-based cokes, furnace black, acetylene black, and pitch-based carbon fibers, and the like. One type of these may be used alone, or two or more types of these may be used in combination.

Among these, natural graphite is classified into flake graphite, crystal line (vein) graphite, and amorphous graphite, based on the properties (see the section of graphite of "Encyclopedia of powder process industry and technology" (published by Industrial Technology Center K.K. in 1974 (Showa 49)) and "Handbook of Carbon, Graphite, Diamond and Fullerenes" (published by Noyes Publications)). Since the graphite crystallinity (degree of graphitization) is the highest, which is 100%, of crystal line (vein) graphite, and the second highest, which is 99.9%, of flake graphite, use of these graphites is preferable.

The origins of the flake graphite, which is natural graphite, are Madagascar, China, Brazil, Ukraine, Canada, and the like. The origin of the crystal line (vein) graphite is mainly Sri Lanka. Major origins of amorphous graphite are the Korean Peninsula, China, Mexico, and the like.

Among these natural graphites, flake graphite and crystal line (vein) graphite have advantages such as high crystallinity of graphite and low impurity content, and thus can be advantageously used in the present invention. Flake graphite is more preferable. Examples of visual techniques for checking if graphite is flaky include a particle surface observation by a scanning electron microscope, a method in which the particles are embedded in a resin to form a thin piece of the resin and then a particle cross-section is cut out, or a method in which a coating film comprising the particles is processed with a cross-section polisher to form a coating film cross section and the particle cross-sections are cut out then observed by a scanning electron microscope, and the like.

The flake graphite and crystal line (vein) graphite include natural graphite which has been highly purified so that the crystallinity of the graphite is substantially perfect and graphite formed artificially. Natural graphite is preferable from the perspectives of being soft and easy to produce a folded structure.

Furthermore, when the Si composite carbon particles (A) of (II) described above is produced, for example, use of graphite particles that have been spheroidized by applying mechanical stress to flake graphite or the like and/or graphite particles that have been granulated by mixing graphite and an organic compound which becomes a carbonaceous material, from the perspective of maintaining the shape as a core of the particle.

Note that the carbon material used as the raw material in the present invention is preferably a substance showing the following physical properties.

The volume-based average particle diameter (d50) of the carbon raw material used as the raw material is not particularly limited; for example, the volume-based average particle diameter (d50) is typically 1 μm to 120 μm, preferably 3 μm to 100 μm, and more preferably 5 μm to 90 μm. When the average particle diameter d50 of the carbon raw material used as the raw material is too large, the particle diameter of the Si composite carbon particles (A) becomes too large, and streak and/or roughness due to the large particle occurs during the step of applying the negative electrode active material, in which the Si composite carbon particles (A) are blended, in slurry form. When the average particle diameter d50 is too small, formation of composite is difficult, and production of the Si composite carbon particles (A) may be difficult.

The tap density of the carbon raw material used as the raw material is typically 0.1 g/cm$^3$ to 1.0 g/cm$^3$, preferably 0.13 g/cm$^3$ to 0.8 g/cm$^3$, and more preferably 0.15 g/cm$^3$ to 0.6 g/cm$^3$. When the tap density is within the range described above, breakage of the Si composite carbon particles (A) due to expansion and contraction of the Si compound particles can be suppressed because minute voids in the Si composite carbon particles (A) are formed easily.

The specific surface area of the carbon material used as the raw material by the BET method is typically 1 m$^2$/g to 40 m$^2$/g, preferably 2 m$^2$/g to 35 m$^2$/g, and more preferably 3 m$^2$/g to 30 m$^2$/g. The specific surface area of the carbon material used as the raw material is reflected on the specific surface area of the Si composite carbon particles (A), and by setting the specific surface area to be 40 m$^2$/g or less, decrease in battery capacity due to increase in irreversible capacity of the Si composite carbon particles (A) can be prevented.

The spacing between planes ($d_{002}$) of the 002 plane by wide-angle X-ray diffraction of the carbon raw material used as the raw material is typically 0.337 nm or less. Meanwhile, $d_{002}$ is typically 0.334 nm or greater. Furthermore, Lc of the carbon raw material used as the raw material by wide-angle X-ray diffraction is 90 nm or greater, and preferably 95 nm or greater. The spacing between planes ($d_{002}$) of 002 plane of 0.337 nm or less indicates that the crystallinity of the carbon raw material used as the raw material is high, and can provide Si composite carbon particles (A) that provide a non-aqueous secondary battery with a high capacity. Furthermore, Lc of 90 nm or greater also indicates the high crystallinity, and can provide Si composite carbon particles (A) that make the capacity of a non-aqueous secondary battery to be high.

Si Compound Particles

The Si compound particles used as the raw material of the Si composite carbon particles (A) in the present invention are preferably substances showing the following physical properties.

The volume-based average particle diameter (d50) of the Si compound particles used as the raw material is typically 0.005 μm or greater, preferably 0.01 μm or greater, more preferably 0.02 μm or greater, and even more preferably 0.03 μm or greater, but typically 10 μm or less, preferably 9 μm or less, and more preferably 8 μm or less, from the perspective of cycle life. When the average particle diameter (d50) is within the range described above, volume expansion associated with charging and discharging of the non-aqueous secondary battery is lowered, and excellent cycle characteristics can be obtained while the charge-discharge capacity is maintained.

The specific surface area of the Si compound particles used as the raw material by the BET method is typically 0.5 m$^2$/g to 120 m$^2$/g, and preferably 1 m$^2$/g to 100 m$^2$/g. The specific surface area within the range described above is preferable from the perspective of achieving high charge/discharge efficiency and high discharge capacity of the non-aqueous secondary battery, rapid insertion and release of lithium during high-speed charging and discharging, and excellent rate characteristics.

The oxygen content of the Si compound particles used as the raw material is not particularly limited; for example, the oxygen content is typically 0.01% by mass to 12% by mass, and preferably 0.05% by mass to 10% by mass.

Regarding the oxygen distribution within the Si compound particle, oxygen may be present in the vicinity of the surface, may be present in the inner part of the particle, or may be uniformly distributed in the particle; however, oxygen is particularly preferably present in the vicinity of the surface. The oxygen content of the particles within the range described above is preferable from the perspectives of suppressing volume expansion associated with charging and discharging due to strong bonding between Si and O, and achieving excellent cycle characteristics of the non-aqueous secondary battery.

The crystallite size of the Si compound particles used as the raw material is not particularly limited; for example, in general, the crystallite size of (111) plane calculate by XRD is typically 0.05 nm or greater, and preferably 1 nm or greater, but typically 100 nm or less, and preferably 50 nm or less. The crystallite size of the particles within the range described above is preferable since the reaction between Si and Li ions proceeds rapidly and the battery exhibits excellent input and output.

Note that the Si compound particles in the Si composite carbon particles (A) preferably have the same properties as the physical properties of the Si compound particles used as the raw material.

Organic Compound which Becomes Carbonaceous Material

The organic compound which becomes a carbonaceous material that is used as a raw material of the Si composite carbon particles (A) in the present invention is preferably a carbon material described in (a) or (b) below.

(a) A carbonizable organic substance selected from the group consisting of coal-based heavy oils, straight-run heavy oils, heavy oils from petroleum cracking, aromatic hydrocarbons, N-ring compounds, S-ring compounds, polyphenylenes, organic synthetic polymers, natural polymers, thermoplastic resins, and thermosetting resins.

(b) A substance obtained by dissolving a carbonizable organic substance in a low molecular weight organic solvent.

As the coal-based heavy oil, coal tar pitches ranging from soft pitch to hard pitch, dry-distillation/liquefaction oils, and the like are preferable.

As the straight-run heavy oil, atmospheric residual oils, vacuum residual oils, and the like are preferable.

As the heavy oil from petroleum cracking, ethylene tar generated as a byproduct during thermal cracking of crude oil, naphtha, and the like, and the like are preferable.

As the aromatic hydrocarbon, acenaphthylene, decacyclene, anthracene, phenanthrene, and the like are preferable.

As the N-ring compound, phenazine, acridine, and the like are preferable.

As the S-ring compound, thiophene, bithiophene, and the like are preferable.

As the polyphenylene, biphenyl, terphenyl, and the like are preferable.

As the organic synthetic polymer, polyvinyl chloride, polyvinyl alcohol, polyvinyl butyral, insolubilization-treated products of these, nitrogen-containing polymers such as polyacrylonitrile, polypyrrole, polyallylamine, polyvinylamine, polyethyleneimine, urethane resins, and urea resins, polythiophene, polystyrene, polymethacrylic acid, and the like are preferable.

As the natural polymer, polysaccharides, such as cellulose, lignin, mannan, polygalacturonic acid, chitosan, saccharose, and the like are preferable.

As the thermoplastic resin, polyphenylene sulfide, polyphenylene oxide, and the like are preferable.

As the thermosetting resin, furfuryl alcohol resins, phenol-formaldehyde resins, imide resins, and the like are preferable.

Furthermore, the carbonizable organic substance may be a carbide of solution or the like prepared by dissolving in a low molecular weight organic solvent, such as benzene, toluene, xylene, quinoline, and n-hexane.

Furthermore, one type of these may be used alone, or two or more types of these may be used in any combination.

Note that, the carbonaceous material in the Si composite carbon particles (A) is preferably a carbonaceous material having the graphite crystallinity that is lower than the graphite crystallinity of the graphite particles (amorphous material). Specifically, the carbonaceous material is preferably a substance showing the following physical properties.

The spacing between planes ($d_{002}$) of the (002) plane by wide-angle X-ray diffraction of the powder of the carbonaceous material is typically 0.340 nm or greater, and preferably 0.342 nm or greater. Furthermore, the spacing is typically less than 0.380 nm, preferably 0.370 nm or less, and more preferably 0.360 nm or less. Too large $d_{002}$ value indicates low crystallinity, and tends to cause lowering of cycle characteristics of the non-aqueous secondary battery, and too small $d_{002}$ value makes it difficult to achieve the effect of compositing the carbonaceous material.

The crystallite size (Lc (002)) of the carbonaceous material determined using the X-ray diffraction Gakushin method of the powder of the carbonaceous material is typically 5 nm or greater, preferably 10 nm or greater, and more preferably 20 nm or greater. Furthermore, the crystallite size is typically 300 nm or less, preferably 200 nm or less, and more preferably 100 nm or less. When the crystallite size is too large, the cycle characteristics of the non-aqueous secondary battery tend to be lowered. When the crystallite size is too small, charge/discharge reactivity may be lowered, and increase in gas generation during storage at high temperatures and/or lowering of large current charge/discharge characteristics may occur.

Types of Production Method

The method of producing the Si composite carbon particles (A) described above is not particularly limited as long as the Si composite carbon particles (A) are Si composite carbon particles formed by compositing elemental silicon and a carbon material; for example, the Si composite carbon particles (A) can be produced by the method (i) to method (iii) described below.

Method (i)

To produce above-described (I) a Si composite carbon particles (A) in which Si compound panicles are dispersed within a granulated body formed from a carbon material and/or (II) a Si composite carbon particles (A) in which Si compound particles are adhered or coated on the periphery of a carbon material which serves as a core, a method in which a carbon material, Si compound particles, and an organic compound which becomes a carbonaceous material are mixed and granulated is exemplified.

As to the specific steps of the method, (1) a step of mixing Si compound particles, a carbon material, and an organic compound which becomes a carbonaceous material; and (2) a step of calcining the mixture obtained in (1) are exemplified.

The Si composite carbon particles (A) can be produced by a method containing at least the steps (1) and (2) described above. The steps (1) and (2) will be described below.

(1) Step of Mixing Si Compound Particles, Carbon Material, and Organic Compound which Becomes Carbonaceous Material The order of charging raw materials is not particularly limited as long as Si compound particles, a carbon material, and an organic compound which becomes the carbonaceous material are mixed to obtain a mixture; however, examples of the method include:

a method in which the carbon material is mixed to the Si compound particles and then the organic compound which becomes the carbonaceous material is mixed;

a method in which the organic compound which becomes the carbonaceous material is mixed to the carbon material and then the Si compound particles are mixed;

a method in which the organic compound which becomes the carbonaceous material is mixed to the Si compound particles and then the carbon material is mixed;

a method in which the Si compound particles, the carbon material, and the organic compound which becomes the carbonaceous material are mixed at once; and the like.

In the method in which the carbon material is mixed to the Si compound particles and then the organic compound which becomes the carbonaceous material is mixed, the organic compound which becomes the carbonaceous material may be mixed after attaching the Si compound particles to the surface and/or inside of the carbon material via mechanical treatment. The mechanical treatment is not particularly limited; however, examples thereof include treatment using a dry-process ball mill, wet-process bead mill, planetary ball mill, vibrating ball mill, Mechanofusion System, Agglomaster (Hosokawa Micron Corporation), Hybridization System, Micros, Miralo (Nara Machinery Co., Ltd.), and the like.

Among the mixing methods described above, the method of mixing the carbon material to the Si compound particles and then mixing the organic compound which becomes the carbonaceous material is preferable from the perspective of achieving excellent dispersibility since each of the Si compound particles and the carbon material is mixed in the state of powder.

Specific examples of the method of mixing the Si compound particles, the carbon material, and the organic compound which becomes the carbonaceous material include a powder mixing method, melt mixing method, solution mixing method, and the like.

The mixing temperature in these methods is typically from ambient temperature to 300° C. or lower, and can be appropriately selected based on the type of the organic compound which becomes the carbonaceous material. Furthermore, the mixing time is typically 10 minutes to 1 hour. Furthermore, the solvent used in the solution mixing method of the Si compound particles, the carbon material, and the organic compound which becomes the carbonaceous material can be appropriately selected from water or organic solvents by which the organic compound can be dissolved or dispersed. Two or more types of different solvents can be used after being mixed.

When the solution mixing method of the Si compound particles, the carbon material, and the organic compound which becomes the carbonaceous material is used, drying is typically performed at the range of 40° C. to 300° C. The drying time can be appropriately selected based on the type of the used solvent; for example, the drying time is typically 1 hour to 24 hours. When appropriate, drying under reduced pressure can be selected.

When the Si compound particles, the carbon material, and the organic compound which becomes the carbonaceous material are mixed, the mixing is typically performed under ordinary pressure; however, if necessary, the mixing can be performed under reduced pressure or increased pressure. The mixing can be performed using a batch method or a continuous method. In any case, the mixing efficiency can be enhanced by using a combination of a device suitable for preliminary mixing and a device suitable for fine mixing.

As the mixing device of the batch method, a high speed mixer; a homogenizer; an ultrasonic homogenizer; a mixer having a structure wherein two frames each are revolved while rotating; a device having a structure wherein one blade performs agitation and dispersing within a tank, such as a dissolver which is a high-speed high-shear mixer or a butterfly mixer for high viscosity; a device of so-called kneader type having a structure wherein a stirring blade of the sigma type or the like is rotated along the sidewall of a semicylindrical mixing vessel; a device of the tri-mixing type which includes stirring blades arranged on three axes; a device of so-called bead mill type which includes a rotating disk and a dispersion medium both disposed in a vessel, and the like are used.

Furthermore, a device having a structure which includes a vessel equipped inside with a plurality of paddles rotated by shafts and in which the inner wall surface of the vessel has been formed substantially along the outer periphery of the rotating paddles preferably in a long double-barrel shape and the paddles have been arranged in pairs along the axial directions of the shafts so that the opposed surfaces of each pair of paddles occlude slidably (e.g., KRC Reactor and SC Processor, both manufactured by Kurimoto, Ltd., TEM, manufactured by Toshiba Machine Selmac Co., Ltd., TEX-K, manufactured by The Japan Steel Works, Ltd., and the like); and a device (external heating type) having a structure which includes a vessel equipped with one shaft inside and with a plurality of plow-shaped or serrate paddles fixed to the shaft so as to be disposed in different phases and in which the inner wall surface thereof has been formed substantially along the outer periphery of the rotating paddles preferably in a cylindrical shape (e.g., Loedige Mixer, manufactured by Loedige GmbH, Flow Shear Mixer, manufactured by Pacific Machinery & Engineering Co., Ltd., DT Dryer, manufactured by Tsukishima Kikai Co., Ltd., and the like) can be also used.

To perform the mixing via the continuous method, a pipeline mixer, a continuous bead mill, or the like can be used.

The proportion of the mixed Si compound particles is typically 1% by mass or greater, preferably 1.5% by mass or greater, more preferably 2% by mass or greater, and even more preferably 2.5% by mass or greater, relative to the total amount of the Si compound particles, the carbon material, and the organic compound which becomes the carbonaceous material. Furthermore, the proportion is typically 50% by mass or less, preferably 40% by mass or less, more preferably 30% by mass or less, and even more preferably 20% by mass or less. When the amount of the Si compound particles is too large, volume expansion associated with charging and discharging in the non-aqueous secondary battery becomes large, and deterioration in capacity tends to be significant. When the amount of the Si compound particles is too small, capacity tends to be insufficient.

The proportion of the mixed carbon material is typically 1% by mass or greater, preferably 2% by mass or greater, more preferably 3% by mass or greater, and even more preferably 5% by mass or greater, relative to the total amount of the Si compound particles, the carbon material, and the organic compound which becomes the carbonaceous material. Furthermore, the proportion is typically 95% by mass or less, preferably 90% by mass or less, more preferably 85% by mass or less, and even more preferably 80% by mass or less. When the amount of the carbon material is too large, amount of voids that constitute the carbon material becomes large, and raising of the electrode density tends to be difficult. Furthermore, when the amount of the carbon material is too small, voids that suppress the volume expansion cannot be formed and it becomes difficult to connect a conductive path, and thus the effect of enhancing the cycle characteristics of the non-aqueous secondary battery is less likely to be sufficiently obtained.

The proportion of the mixed organic compound which becomes the carbonaceous material relative to the total amount of the Si compound particles, the carbon material, and the organic compound which becomes the carbonaceous material is typically 1% by mass or greater, preferably 1.5% by mass or greater, more preferably 2% by mass or greater, and even more preferably 2.5% by mass or greater. Furthermore, the proportion is typically 60% by mass or less, preferably 50% by mass or less, more preferably 40% by mass or less, and even more preferably 30% by mass or less. When the proportion of the organic compound which becomes the carbonaceous material is too large, aggregation of the active materials tends to occur during a calcining process. Furthermore, when the proportion of the organic compound which becomes the carbonaceous material is too small, sufficient effect in proceeding a reduction reaction and/or suppressing aggregation of the active materials is less likely to be achieved.

(2) Step of Calcining the Mixture Obtained in (1)

In this step, a mixture containing the Si compound particles, the carbon material, and the organic compound which becomes the carbonaceous material obtained in the step (1) is calcined.

The atmosphere during the calcination is a non-oxidizing atmosphere, and preferably the calcination is performed in a non-oxidizing atmosphere by circulating nitrogen, argon, carbon dioxide, ammonia, hydrogen, and the like.

The reason why the calcination is performed in a non-oxidizing atmosphere as described above is to prevent oxidation of the Si compound particles, the carbon material, and the organic compound which becomes the carbonaceous material.

The calcination temperature varies depending on the calcination atmosphere and the organic compound which becomes the carbonaceous material; however, as an example, the calcination temperature is typically 500° C. or higher, preferably 800° C. or higher, and more preferably 850° C. or higher, in a nitrogen circulated atmosphere. Furthermore, the calcination temperature is typically at most 3000° C. or lower, preferably 2000° C. or lower, and more preferably 1500° C. or lower. When the calcination temperature is too low, carbonization does not sufficiently proceed, and the initial irreversible capacity during charging and discharging of the non-aqueous secondary battery may increase, and the calcination time needs to be long since the reduction rate of the Si compound is lowered. However, the reduction rate can be increased even at low temperatures by changing the calcination atmosphere to a stronger reduction atmosphere such as a hydrogen atmosphere.

On the other hand, when the calcination temperature is too high, the carbide of the organic compound which becomes the carbonaceous material reaches a crystal structure that is equivalent to the crystal structure of the carbon material of the raw material in the mixture, which makes it difficult to achieve the effect of coating. Furthermore, reduction in yield due to the vaporization of elemental silicon and increase in production costs tend to occur.

In the calcination treatment conditions, temperature conditions of heat history, rate of temperature increase, rate of cooling, heat treatment time, and the like can be appropriately set. Furthermore, it is also possible to perform the heat treatment at a relatively low temperature range and then raise the temperature to a predetermined temperature.

Note that the reactor used in this step may be a batch type or continuous type, and may be single reactor or a plurality of reactors. The oven used for the calcination is not particularly limited as long as the oven satisfies the requirements described above; however, examples thereof include a reaction tank, such as a shuttle furnace, a tunnel oven, a lead hammer furnace, a rotary kiln, and an autoclave, a coker (a tank for heat treatment of the coke production), a Tammann furnace, and an Atchison furnace. As the heating method, high frequency induction heating, direct resistance heating, indirect resistance heating, direct combustion heating, radiation heating, and the like can be used. During the treatment, agitation may be performed as necessary.

Other Steps

For the composite carbon material that has undergone the steps described above, powder processing, such as pulverization, disaggregation, and classification, is performed to obtain the Si composite carbon particles (A).

Devices used for the pulverization or disaggregation are not particularly limited; for example, examples of coarse grinders include a shearing mill, jaw crusher, impact crusher, cone crusher, and the like. Examples of intermediate grinders include a roll crusher, hammer mill, and the like. Examples of pulverizers include a ball mill, vibrating mill, pin mill, agitation mill, jet mill, and the like.

Devices used for the classification are not particularly limited. For example, in the case of dry sieving, a rotary sieve, rocking sieve, swinging sieve, oscillating sieve, or the like can be used. In the case of dry air classification, a gravity classifier, inertial classifier, or centrifugal classifier (classifier, cyclone, and the like) can be used. In the case of wet sieving, a mechanical wet classifier, hydraulic classifier, sedimentation classifier, centrifugal wet classifier, or the like can be used.

By the production methods described above, the Si composite carbon particles (A) can be produced. However, the Si composite carbon particles (A) are not limited to those produced by the production methods described above.

Method (ii)

As the method of producing (III) the Si composite carbon particles (A) in which the Si compound particles are dispersed within a carbon material which has been spheroidized described above, a method, in which a carbon material and Si compound particles are mixed and then applied with spheroidizing treatment to allow the Si compound particles to be contained within the Si composite carbon particle, is exemplified. Note that the carbon material and the Si compound particles as the raw materials in the method (ii) and the organic compound which becomes the carbonaceous material used in the step (3) described below are not particularly limited, and substances that are the same as those in the method (i) can be used.

As an example of preferable production methods, a method comprising the following steps is exemplified.

(1) Step of mixing and fixing the carbon material and the Si compound particles (2) Step of subjecting the material obtained in (1) to spheroidizing treatment (1) Step of Mixing and Fixing Carbon Material and Si Compound Particles The proportion of the mixed Si compound particles is typically 1% by mass or greater, preferably 3% by mass or greater, more preferably 5% by mass or greater, even more preferably 7% by mass or greater, and particularly preferably 10% by mass or greater, relative to the total amount of the Si compound particles and the carbon material. Furthermore, the proportion is typically 95% by mass or less, preferably 70% by mass or less, more preferably 60% by mass or less, even more preferably 50% by mass or less, particularly preferably 40% by mass or less, and most preferably 35% by mass or less. The content within this range is preferable since sufficient capacity of the non-aqueous secondary battery can be achieved.

The method of mixing and fixing the carbon material and the Si compound particles is not particularly limited. For example, a method in which a Si slurry which is formed by dispersing the Si compound particles in a solvent is used to mix with the carbon material in a manner that the wet Si compound particles are not dried is exemplified. Such a Si slurry is preferable, since it suppresses the aggregation of the Si compound particles and fixing of the Si compound particles onto the surface of the carbon material is facilitated.

Examples of the dispersing solvent of the Si compound particles include nonpolar compounds having an aromatic ring and aprotic polar solvents. The type of the nonpolar compound having an aromatic ring is not particularly limited; for example, a nonpolar compound having no reactivity to the Si compound is more preferable. Examples thereof include aromatic compounds that are liquid at ambient temperature, such as benzene, toluene, xylene, cumene, and methylnaphthalene, alicyclic hydrocarbons, such as cyclohexane, methylcyclohexane, methylcyclohexene, and bicyclohexyl, petrochemicals, such as light oil and heavy oil, and residual oils of petrochemicals. Among these, xylene is preferable, methylnaphthalene is more preferable, and heavy oil is even more preferable from the perspective of having a high boiling point. When enhancement of pulverizing efficiency is attempted in wet pulverization, heat tends to be generated. A solvent with a low boiling point may be volatilized, and the concentration may be high. On the other hand, as the aprotic polar solvent, substances that dissolve organic solvent, such as N-methyl-2-pyrrolidone (NMP), γ-butyrolactone (GBL), and N,N-dimethylformamide (DMF), are preferable as well as water. Among these, N-methyl-2-pyrrolidone (NMP) is preferable from the perspectives of being not easily decomposed and having a high boiling point.

The proportion of the mixed Si compound particles and dispersing solvent is a proportion such that the proportion of the Si compound particles in the obtained mixture is typically 10% by mass or greater, and preferably 20% by mass or greater, but typically 50% by mass or less, and preferably 40% by mass or less.

When the mixed proportion of the dispersing solvent is too high, costs tend to be increased. When the mixed proportion of the dispersing solvent is too low, uniform dispersion of the Si compound particles tends to be difficult.

The Si compound particles are preferably dispersed uniformly on the surface of the carbon material, and thus an excessive amount of the dispersing solvent that is used to wet-pulverize the Si compound particles can be added during mixing. In the present description, when the Si compound particles are mixed to the carbon material as a slurry, the solid content of the Si compound particles is typically 10% or greater, preferably 15% or greater, and more preferably 20% or greater, but typically 90% or less, preferably 85% or less, and more preferably 80% or less. When the proportion of the solid content is too large, fluidity of the slurry is lost, and it tends to be difficult to disperse the Si compound particles in the carbon material. When the proportion is too small, handling during the step tend to be uneasy.

After the mixing, the Si compound particles can be fixed onto the carbon material by removing the dispersing solvent via vaporization and by drying the dispersing solvent using an evaporator, dryer, or the like.

Furthermore, mixing and fixing can be performed, without adding an excessive amount of the dispersing solvent, by vaporizing the dispersing solvent while the mixture is heated as is in a high speed stirrer. At this time, a buffer material such as a resin or pitch can be used to fix the Si compound particles onto the carbon material. Of these, use of a resin is preferable. It is conceived that the resin serves as a measure to prevent releasing of the Si compound particles from the carbon material during the spheroidizing step as well as a measure to fix the Si compound particles to the carbon material. Note that, when the buffer material is added, the buffer material may be added at this stage or may be added during wet pulverization of the Si compound particles.

Note that the resin that can be used as the buffer material of this step (1) is not particularly limited, and may be resins that are the same as the organic compound which becomes the carbonaceous material described above. Polystyrene, polymethacrylic acid, and polyacrylonitrile are preferable. Polyacrylonitrile is particularly preferably used from the perspective of a large amount of carbon residues after the calcination and from the perspective of a relatively high decomposition temperature. Note that the decomposition temperature of the resin can be measured using the differential scanning calorimetry (DSC) in an inert gas atmosphere. The decomposition temperature of the resin is preferably 50° C. or higher, more preferably 75° C. or higher, and even more preferably 100° C. or higher. Too high decomposition temperature causes no problems; however, when the decomposition temperature is too low, decomposition may occur during the drying step described below.

The buffer material may be used in the state dispersed in a solvent or in the dried state, and when a solvent is used, the solvent same as the dispersing solvent of the Si compound particles can be used.

Mixing is typically performed under ordinary pressure; however, if necessary, the mixing can be performed under reduced pressure or increased pressure. The mixing can be performed using a batch method or a continuous method. In any case, the mixing efficiency can be enhanced by using a combination of a device suitable for preliminary mixing and a device suitable for fine mixing. Furthermore, a device that performs mixing and fixing (drying) at the same time can also be used. Typically, the drying can also be performed under reduced pressure or increased pressure, and preferably performed under reduced pressure.

The drying time is typically 5 minutes or longer, preferably 10 minutes or longer, more preferably 20 minutes or longer, and even more preferably 30 minutes or longer, but typically 5 hours or shorter, preferably 3 hours or shorter, and more preferably 1 hour or shorter. When the time is too long, costs tend to be increased. When the time is too short, uniform drying tends to be difficult.

The drying temperature varies depending on the solvent; for example, the drying temperature is preferably such that the time described above can be realized. Furthermore, the drying temperature is preferably equal to or lower than the temperature at which resin does not deform.

As the mixing device of the batch method, a mixer having a structure wherein two frames each are revolved while rotating; a device having a structure wherein one blade performs agitation and dispersing within a tank, such as a dissolver which is a high-speed high-shear mixer or a butterfly mixer for high viscosity; a device of so-called kneader type having a structure wherein a stirring blade of the sigma type or the like is rotated along the sidewall of a semicylindrical mixing vessel; a device of the tri-mixing type which includes stirring blades arranged on three axes; a device of so-called bead mill type which includes a rotating disk and a dispersion medium both disposed in a vessel, and the like are used.

Furthermore, a device having a structure which includes a vessel equipped inside with a plurality of paddles rotated by shafts and in which the inner wall surface of the vessel has been formed substantially along the outer periphery of the rotating paddles preferably in a long double-barrel shape and the paddles have been arranged in pairs along the axial directions of the shafts so that the opposed surfaces of each pair of paddles occlude slidably (e.g., KRC Reactor and SC Processor, both manufactured by Kurimoto, Ltd., TEM, manufactured by Toshiba Machine Selmac Co., Ltd., TEX-K, manufactured by The Japan Steel Works, Ltd., and the like); and a device (external heating type) having a structure which includes a vessel equipped with one shaft inside and with a plurality of plow-shaped or serrate paddles fixed to the shaft so as to be disposed in different phases and in which the inner wall surface thereof has been formed substantially along the outer periphery of the rotating paddles preferably in a cylindrical shape (e.g., Loedige Mixer, manufactured by Loedige GmbH, Flow Shear Mixer, manufactured by Pacific Machinery & Engineering Co., Ltd., DT Dryer, manufactured by Tsukishima Kikai Co., Ltd., and the like) can be also used. To perform the mixing via the continuous method, a pipeline mixer, a continuous bead mill, or the like can be used. Furthermore, homogenization can also be performed by means such as ultrasonic dispersion or the like.

(2) Step of Subjecting the Material Obtained in (1) to Spheroidizing Treatment

By undergoing this step (2), the Si composite carbon particles (A), in which a structure where the carbon material is folded is observed and in which Si compound particles are present in voids within the folded structure, can be produced. Note that the structure described above can be checked by observing the particle cross section of the Si composite carbon particle (A) using techniques such as a field emission scanning electron microscopy-energy dispersive X-ray spectroscopy (SEM-EDX) analysis and X-ray photoelectron spectroscopy (XPS) analysis.

That is, among the production methods to obtain the Si composite carbon particles (A), a method in which the spheroidizing treatment is performed on a composite obtained by fixing the Si compound particles onto the surface of the carbon material that is obtained in the step (1) described above and that is prior to the folding (hereinafter, also referred to as "composite") is preferable. In particular, in the present invention, the production conditions that are similar to those described below are preferably set appropriately in a manner that a predetermined range of the Si compound particles are present in voids within the folded structure.

Note that the spheroidizing treatment is basically a treatment utilizing mechanical energy (mechanical action such as shock compression, friction, and shear force), and specifically, a treatment utilizing a hybridization system is preferable. This system includes a rotor having a large number of blades which impose a mechanical action such as shock compression, friction, shear force, and the like. In this system, a strong air stream is generated by the rotation of the rotor, and large centrifugal force is thereby applied to the carbon material in the composite obtained in the step (1) described above. The carbon material in the composite obtained in the step (1) described above hence collide with each other and with the wall and the blades. As a result, the carbon material in the composite obtained in the step (1) described above can be neatly folded.

As a device used for the spheroidizing treatment, for example, a device which has a rotor including a casing and a large number of blades disposed within the casing and in which the rotor is rotated at a high speed to exert a mechanical action, such as shock compression, friction, and shear force, on the carbon material in the composite that was obtained in the step (1) described above and that has been introduced into the casing, thereby performing a surface treatment, and the like can be used. Examples thereof include devices such as a dry-process ball mill, wet-process bead mill, planetary ball mill, vibrating ball mill, Mechanofusion System, Agglomaster (Hosokawa Micron Corporation), Hybridization System, Micros, Miralo (Nara Machinery Co., Ltd.), CF Mill (Ube Industries, Ltd.), Theta Composer (Tokuju Corporation), and the like. Examples of preferred devices among these include a dry-process ball mill, wet-process bead mill, planetary ball mill, vibrating ball mill, Mechanofusion System, Agglomaster (Hosokawa Micron Corporation), Hybridization System, Micros, Miralo (Nara Machinery Co., Ltd.), CF Mill (Ube Industries, Ltd.), Theta Composer (Tokuju Corporation), pulverizer, and the like. Among these, the Hybridization System, manufactured by Nara Machinery Co., Ltd., is particularly preferable.

Note that the carbon material, which is subjected to the spheroidizing treatment, in the composite obtained in the step (1) described above may be a substance that has undergone a certain spheroidizing treatment under conventional conditions. Furthermore, mechanical actions may be applied repeatedly by circulating the composite obtained in the step (1) described above or by subjecting the composite to this step for a plurality of times.

The spheroidizing treatment is performed using such a device, and during this treatment, the spheroidizing treatment is performed at the rotation speed of the rotor to typically 2000 rpm to 8000 rpm, and preferably 4000 rpm to 7000 rpm, for typically in the range of 1 minute to 60 minutes.

Note that, when the rotation speed of the rotor is too small, the spheroidizing treatment is weak and the tap density of the obtained Si composite carbon particles (A) may not be sufficiently increased. On the other hand, when the rotation speed is too large, the effect of pulverization becomes greater than the effect of the spheroidizing treatment, and tap density may be lowered since the particles are broken. Furthermore, if the time for the spheroidizing treatment is too short, it is not possible to achieve a high tap density while the particle diameter is made sufficiently small. On the other hand, if the time is too long, the carbon material in the composite obtained in the step (1) described above may be broken into fragments.

The obtained Si composite carbon particles (A) may be subjected to classification. Note that, when the obtained Si composite carbon particles (A) do not have the physical properties in the range described in the present invention, the desired ranges of the physical properties can be achieved by subjecting the Si composite carbon particles (A) to classification repeatedly (typically 2 to 10 times, and preferably 2 to 5 times). Examples of the classification include dry classification (air classification and sieves) and wet classification; however, dry classification, especially air classification, is preferable from the perspectives of costs and productivity.

(3) Step of Coating Carbonaceous Material to the Si Composite Carbon Particles (A) Obtained in (2)

While the Si composite carbon particles (A) are obtained as described in the step (2) above, the Si composite carbon particles (A) preferably contain a carbonaceous material, and as a more specific aspect, at least a part of the surface thereof is more preferably coated with the carbonaceous material (hereinafter, such Si composite carbon particles (A) are also referred to as "carbonaceous material-coated Si composite carbon particles"). Note that, although the carbonaceous material-coated Si composite carbon particles are described distinctively from the Si composite carbon particles (A) for convenience in the present description, the carbonaceous material-coated Si composite carbon particles are considered to be also included in the Si composite carbon particles (A) in the present description.

In the coating treatment, the carbonaceous material-coated Si composite carbon particles can be obtained by using the organic compound which becomes the carbonaceous material as a coating material to the Si composite carbon particles (A) described above, and mixing and calcining these.

By setting the calcination temperature to typically 600° C. or higher, preferably 700° C. or higher, and more preferably 900° C. or higher, but typically 2000° C. or lower, preferably 1500° C. or lower, and more preferably 1200° C. or lower, an amorphous material is obtained as the carbonaceous material. When heat treatment is performed at typically 2000° C. or higher, and preferably 2500° C. or higher, but typically 3200° C. or lower, a graphite material is obtained as the carbonaceous material. The amorphous material is carbon having a low crystallinity, and the graphite material is carbon having a high crystallinity.

In the coating treatment, the carbonaceous material-coated Si composite carbon particles can be obtained by using the Si composite carbon particles (A) described above as a core material and the organic compound which becomes the carbonaceous material as a coating material, and mixing and calcining these. The coating layer may contain Si compound particles and/or carbon microparticles. The shape of the carbon microparticles is not particularly limited, and may be any of granular, spherical, chain-like, needle-like, fibrous, plate-like, flake, or the like.

Specifically, while the carbon microparticles are not particularly limited, examples thereof include coal fine powder, gas phase carbonization powder, carbon black, Ketjen black, carbon nanofiber, and the like. Among these, carbon black is particularly preferable. When the carbon black is used, input/output characteristics of the non-aqueous secondary battery becomes high even at low temperatures, and the advantage that the carbon black can be easily obtained at a low cost is given.

The average particle diameter d50 of the carbon microparticles is typically 0.01 μm to 10 μm, preferably 0.05 μm or greater, more preferably 0.07 μm or greater, and even more preferably 0.1 μm or greater, but preferably 8 μm or less, more preferably 5 μm or less, and even more preferably 1 μm or less.

When the carbon microparticles have a secondary structure in which primary particles are aggregated/flocculated, as long as the primary particle diameter is 3 nm to 500 nm, other physical properties and types thereof are not particularly limited. However, the primary particle diameter is preferably 3 nm or greater, more preferably 15 nm or greater, even more preferably 30 nm or greater, and particularly preferably 40 nm or greater, but preferably 500 nm or less, more preferably 200 nm or less, even more preferably 100 nm or less, and particularly preferably 70 nm or less. The primary particle diameter of the carbon microparticles can be measured by scanning electron microscope observation using SEM or the like, by a laser diffraction type particle size distribution meter, and the like.

Physical Properties of Carbonaceous Material-Coated Si Composite Carbon Particles Although the carbonaceous material-coated Si composite carbon particles show the same physical properties as those of the Si composite carbon particles (A) described above, in particular, preferable physical properties of the carbonaceous material-coated Si composite carbon particles that are varied due to the coating treatment will be described below.

Spacing Between Planes ($d_{002}$) of (002) Plane

The spacing between planes ($d_{002}$) of the (002) plane by wide-angle X-ray diffraction of the carbonaceous material-coated Si composite carbon particles is typically 0.336 nm or greater, preferably 0.337 nm or greater, more preferably 0.340 nm or greater, and even more preferably 0.342 nm or greater. Furthermore, the spacing between planes ($d_{002}$) is typically less than 0.380 nm, preferably 0.370 nm or less, and more preferably 0.360 nm or less. Too large $d_{002}$ value indicates low crystallinity, and tends to cause lowering of cycle characteristics of the non-aqueous secondary battery, and too small $d_{002}$ value makes it difficult to achieve the effect of compositing the carbonaceous material.

Content

The carbonaceous material-coated Si composite carbon particles contain an amorphous material or graphite material; however, among these, the carbonaceous material-coated Si composite carbon particles containing an amorphous carbonaceous material are preferable from the perspective of acceptability of lithium ions. The content of the amorphous carbonaceous material is typically 0.5% by mass to 30% by mass, preferably 1% by mass to 25% by mass, and more preferably 2% by mass to 20% by mass. When the content is too large, amount of the amorphous portion of the negative electrode material becomes large, and reversible capacity when a battery is assembled tends to be small. On the other hand, when the content is too small, the amorphous material is not uniformly coated on the Si composite carbon particles (A) which serve as a core, firm granulates cannot be formed, and the particle diameter tends to be too small when pulverization is performed after the calcination.

Note that the content of the amorphous material derived from the organic compound that is finally obtained (coating proportion) can be calculated by the following formula (4) using the amount of the used Si composite carbon particles (A), the amount of the organic compound which becomes the carbonaceous material, and the proportion of the carbon residues measured by the Micro method in accordance with JIS K 2270.

Content of carbonaceous material (% by mass)=
(mass of organic compound which becomes carbonaceous material×proportion of carbon residue×100)/{total mass of graphite particles and Si compound particles contained in sample (Si composite carbon particles (A))+(mass of organic compound which becomes the carbonaceous material×proportion of carbon residue)}    Formula (4)

The method (ii) may contain a pulverization treatment step, particle size classification step, and mixing step with other negative electrode active materials, in addition to the coating step of the carbonaceous material described above.

Method (iii)

Examples of the method of producing (IV) the Si composite carbon particles (A) in which a carbonaceous material is adhered or coated on the periphery of the Si compound particle which serves as a core described above include techniques that use solid-phase reaction, liquid-phase reaction, sputtering, chemical vapor deposition, and the like.

Now, a synthesis method utilizing a solid-phase reaction will be described. The solid-phase reaction is a method of synthesizing composite particles by weighing solid raw materials in the forms of powders or the like to form a predetermined composition, mixing, and then performing heat treatment. For the Si composite carbon particles (A) in the present invention, this corresponds to a method in which, for example, the Si compound particles and the organic compound which becomes the carbonaceous material are brought into contact at a high temperature to react.

Since the Si compound particles and the organic compound which becomes the carbonaceous material are brought into contact at a high temperature of 1000° C. or higher in an anaerobic (low oxygen) environment in the solid-phase reaction step, this step can be performed by using a device that can set such an environment, such as a high-frequency induction furnace, graphite furnace, and electric furnace. The temperature condition in the solid-phase reaction step is not particularly limited; for example, the temperature is typically a temperature that is not lower than the melt temperature of the Si compound particles, preferably a temperature that is 10° C. higher than the melt temperature of the Si compound particles or higher, and more preferably a temperature that is 30° C. higher than the melt temperature of the Si compound particles or higher. Specifically, the temperature is typically 1420° C. or higher, preferably 1430° C. or higher, and more preferably 1450° C. or higher, but typically 2000° C. or lower, preferably 1900° C. or lower, and more preferably 1800° C. or lower. Furthermore, regarding the anaerobic (low oxygen) environment, the step is preferably performed under reduced pressure (vacuum) in an inert atmosphere, such as argon. When the step is performed under reduced pressure (vacuum), the pressure is typically 2000 Pa or lower, preferably 1000 Pa or lower, and more preferably 500 Pa or lower. Furthermore, the treatment time is typically 0.1 hours or longer, preferably 0.5 hours or longer, and more preferably 1 hour or longer, but typically 3 hours or shorter, preferably 2.5 hours or shorter, and more preferably 2 hours or shorter.

The method (iii) may contain a pulverization treatment step, particle size classification step, and mixing step with other negative electrode active materials, in addition to the solid-phase reaction step described above.

Examples of coarse grinders used in the pulverization treatment step include a jaw crusher, impact crusher, cone crusher, and the like. Examples of intermediate grinders include a roll crusher, hammer mill, and the like. Examples of pulverizers include a ball mill, vibrating mill, pin mill, agitation mill, jet mill, and the like.

Among these, ball mill, vibrating mill, and the like require short time for the pulverization and are preferable from the perspective of treatment speed.

The pulverization speed is appropriately set depending on the type of the device and the size; however, for example, in the case of ball mill, the pulverization speed is typically 50 rpm or higher, preferably 100 rpm or higher, more preferably 150 rpm or higher, and even more preferably 200 rpm or higher. Furthermore, the pulverization speed is typically 2500 rpm or lower, preferably 2300 rpm or lower, and more preferably 2000 rpm or lower. When the speed is too high, controlling of the particle diameter tends to be difficult, and when the speed is too low, treatment speed tends to be slow.

The pulverization time is typically 30 seconds or longer, preferably 1 minute or longer, more preferably 1 minute and 30 seconds or longer, and even more preferably 2 minutes or longer. Furthermore, the pulverization time is typically 3 hours or shorter, preferably 2.5 hours or shorter, and more preferably 2 hours or shorter. When the pulverization time is too short, controlling of the particle diameter tends to be difficult, and when the pulverization time is too long, productivity of the Si composite carbon particles (A) tends to be lowered.

In the case of vibrating mill, the pulverization speed is typically 50 rpm or higher, preferably 100 rpm or higher, more preferably 150 rpm or higher, and even more preferably 200 rpm or higher. Furthermore, the pulverization speed is typically 2500 rpm or lower, preferably 2300 rpm or lower, and more preferably 2000 rpm or lower. When the speed is too high, controlling of the particle diameter tends to be difficult, and when the speed is too low, treatment speed tends to be slow.

The pulverization time is typically 30 seconds or longer, preferably 1 minute or longer, more preferably 1 minute and 30 seconds or longer, and even more preferably 2 minutes or longer. Furthermore, the pulverization time is typically 3 hours or shorter, preferably 2.5 hours or shorter, and more preferably 2 hours or shorter. When the pulverization time is too short, controlling of the particle diameter tends to be difficult, and when the pulverization time is too long, productivity tends to be lowered.

As the classification condition in the classification step, the sieve opening is typically 53 µm or less, preferably 45 µm or less, more preferably 38 µm or less, in a manner that the particle diameter described above is achieved.

Devices used for the classification are not particularly limited. For example, in the case of dry sieving, a rotary sieve, rocking sieve, swinging sieve, oscillating sieve, or the like can be used.

In the case of dry air classification, a gravity classifier, inertial classifier, or centrifugal classifier (classifier, cyclone, and the like) can be used.

In the case of wet sieving, a mechanical wet classifier, hydraulic classifier, sedimentation classifier, centrifugal wet classifier, or the like can be used.

Among the methods (i) to (iii) described above, the method (ii) is more preferable from the perspectives of suppressing expansion of the electrode plate and breakage of the particles by allowing the elemental silicon to be contained within the graphite that has been spheroidizing-treated, and by suppressing the reactivity between the electrolytic solution and the elemental silicon.

Amorphous Composite Graphite Particles (B)

The amorphous composite graphite particles (B) in the present invention will be described below.

The amorphous composite graphite particles (B) are not particularly limited as long as a substance in which graphite particles (C) and an amorphous carbon are composited is selected, and a publicly known raw material may be used. Note that "graphite particles (C) and an amorphous carbon are composited" in the present invention refers to a state where the amorphous carbon is adhered, attached, or composited onto the graphite particles (C), more specifically, a state where the amorphous carbon is attached to pores of the graphite particles (C), a state where the amorphous carbon is bound to the entire or part of the graphite particles (C) surface and at least two graphite particles (C) and the amorphous carbon are composited, or the like.

The state can be checked by observing the particle cross section of the amorphous composite graphite particles (B) using techniques such as a field emission scanning electron microscopy-energy dispersive X-ray spectroscopy (SEM-EDX) analysis and X-ray photoelectron spectroscopy (XPS) analysis.

Examples of the amorphous composite graphite particles (B) include graphite particles disclosed in Japanese Patent Application Kokai Publication No. 2000-340232 (unexamined, published Japanese patent application), Japanese Patent Application Kokai Publication No. H10-158005 (unexamined, published Japanese patent application), and the like. The amorphous composite graphite particles (B) that further enhances the effect of the present invention will be described below. Note that, since the amorphous composite graphite particles (B) are particles in which graphite particles (C) and an amorphous carbon are composited, increase in overvoltage of the Si composite carbon particles (A) is moderated, thereby making it possible to reduce resistance of the entire electrode plate.

Properties of the Amorphous Composite Graphite Particles (B)

The amorphous composite graphite particles (B) preferably have the following properties.

(a) X-Ray Parameters of Amorphous Composite Graphite Particles (B)

The spacing between planes ($d_{002}$) of the 002 plane by wide-angle X-ray diffraction of the amorphous composite graphite particles (B) is typically 0.337 nm or less, and preferably 0.336 nm or less. Too large $d_{002}$ value indicates low crystallinity, and may increase initial irreversible capacity when a non-aqueous secondary battery is formed. On the other hand, since the theoretical value of the spacing between planes of the 002 plane of graphite is 0.3354 nm, the d value is typically 0.3354 nm or greater.

Furthermore, crystallite size (Lc) of the amorphous composite graphite particles (B) is in the range of typically 30 nm or greater, preferably 50 nm or greater, and more preferably 100 nm or greater. When the crystallite size is less than this range, crystallinity is lowered, and the discharge capacity of the battery tends to be lowered. Note that the lower limit of the Lc is the theoretical value of graphite.

(b) Volume-Based Average Particle Diameter (d50) of Amorphous Composite Graphite Particles (B)

The average particle diameter d50 of the amorphous composite graphite particles (B) is typically 50 µm or less, preferably 40 µm or less, more preferably 30 µm or less, and even more preferably 25 µm or less, but typically 1 µm or greater, preferably 4 µm or greater, and more preferably 7 µm or greater. When the average particle diameter d50 is too small, since decomposition of the electrolytic solution is increased due to increased specific surface area, initial efficiency of the non-aqueous secondary battery tends to be lowered. When the average particle diameter d50 is too large, lowering in the rapid charge/discharge characteristics may occur.

(c) Aspect Ratio of Amorphous Composite Graphite Panicles (B)

The aspect ratio of the amorphous composite graphite particles (B) is typically 1 or greater, preferably 1.3 or greater, more preferably 1.4 or greater, and even more preferably 1.5 or greater, but typically 4 or less, preferably 3 or less, more preferably 2.5 or less, and even more preferably 2 or less.

When the aspect ratio is too large, since the particles tend to be arranged in the parallel direction relative to the current collector when formed into an electrode, continuous voids in the thickness direction of the electrode are not sufficiently ensured, and thus lithium ion mobility in the thickness direction is lowered and rapid charge/discharge characteristics of the non-aqueous secondary battery are likely to be lowered.

(d) BET Specific Surface Area (SA) of Amorphous Composite Graphite Particles (B)

The specific surface area of the amorphous composite graphite particles (B) measured by the BET method is typically 0.5 $m^2/g$ or greater, preferably 1 $m^2/g$ or greater, more preferably 1.5 $m^2/g$ or greater, and even more preferably 2 $m^2/g$ or greater. Furthermore, the specific surface area is typically 15 $m^2/g$ or less, preferably 12 $m^2/g$ or less, more preferably 10 $m^2/g$ or less, even more preferably 8 $m^2/g$ or less, and particularly preferably 6 $m^2/g$ or less. If the specific surface area is too large, when the amorphous composite graphite particles (B) are used as a negative electrode active material, reactivity between an electrolytic solution and a portion exposed to the electrolytic solution is increased. Because of this, decrease in initial efficiency and increase in amount of generated gas are easily caused, and thus it tends to be difficult to obtain a preferable battery. When the specific surface area is too small, the number of the sites where lithium ions move in and out becomes small, thereby making high-speed charge/discharge characteristics and output characteristics poor.

(e) Tap Density of Amorphous Composite Graphite Particles (B)

The tap density of the amorphous composite graphite particles (B) is typically 0.8 $g/cm^3$ or greater, preferably 0.85 $g/cm^3$ or greater, more preferably 0.9 $g/cm^3$ or greater, and even more preferably 0.95 $g/cm^3$ or greater. Furthermore, the tap density is typically 1.8 $g/cm^3$ or less, preferably 1.5 $g/cm^3$ or less, and more preferably 1.3 $g/cm^3$ or less.

When the tap density is less than 0.8 $g/cm^3$, sufficient continuous voids are not ensured in the electrode and lithium ion mobility in the electrolytic solution held in voids is lowered, and thus rapid charge/discharge characteristics of the non-aqueous secondary battery are likely to be lowered.

(f) Roundness of Amorphous Composite Graphite Particles (B)

The roundness of the amorphous composite graphite particles (B) is typically 0.85 or greater, preferably 0.88 or greater, more preferably 0.89 or greater, and even more preferably 0.90 or greater. Furthermore, the roundness is typically 1 or less, preferably 0.99 or less, more preferably 0.98 or less, and even more preferably 0.97 or less. When the roundness is too small, since the particles tend to be arranged in the parallel direction relative to the current collector when formed into an electrode, continuous voids in the thickness direction of the electrode are not sufficiently ensured, and thus lithium ion mobility in the thickness direction is lowered and rapid charge/discharge characteristics of the non-aqueous secondary battery are likely to be lowered. When the roundness is too large, lowering of the effect of suppressing breakage of conductive path and lowering of cycle characteristics tend to occur.

(g) Raman R Value of Amorphous Composite Graphite Particles (B)

The Raman R value (defined as described above) of the amorphous composite graphite particles (B) is typically 1 or less, preferably 0.8 or less, more preferably 0.6 or less, and even more preferably 0.5 or less, but typically 0.05 or greater, preferably 0.1 or greater, more preferably 0.2 or greater, and even more preferably 0.25 or greater. When the Raman R value is less than this range, crystallinity of the particle surface becomes too high and the number of sites for inserting Li decreases, and rapid charge/discharge characteristics of the non-aqueous secondary battery are likely to be lowered. On the other hand, when the Raman R value is greater than this range, crystallinity of the particle surface is disordered and reactivity to the electrolytic solution increases, and thus lowering in charge/discharge efficiency and increase in generation of gas tend to occur.

(h) DBP Oil Absorption of Amorphous Composite Graphite Particles (B)

The dibutyl phthalate (DBP) oil absorption of the amorphous composite graphite particles (B) is typically 65 mL/100 g or less, preferably 60 mL/100 g or less, more preferably 55 mL/100 g or less, and even more preferably 50 mL/100 g or less. Furthermore, the DBP oil absorption is typically 30 mL/100 g or greater, and preferably 40 mL/100 g or greater. When the DBP oil absorption is too large, streak or the like during coating of slurry containing the carbon material of the present invention tends to be caused when a negative electrode is formed. When the DBP oil absorption is too small, the particles may have almost no pore structures, and thus area for reacting with the electrolytic solution tends to be smaller.

Method of Producing Amorphous Composite Graphite Particles (B)

The amorphous composite graphite particles (B) of the present invention are particles in which graphite particles (C) and an amorphous carbon are composited.

As the graphite particles (C) which serve as the raw material of the amorphous composite graphite particles (B), any of natural graphite or artificial graphite may be used. Graphite having low impurities is preferable, and as necessary, various purification treatments may be performed before use.

The shape of the graphite particles (C) is not particularly limited, and the shape may be appropriately selected from spherical, flaky, fibrous, or amorphous particle, or particles in which a plurality of particles are bonded or aggregated in nonparallel.

Examples of the natural graphite include crystal line (vein) graphite, flake graphite, amorphous graphite, and the like. The origin of the crystal line (vein) graphite is mainly Sri Lanka. The origins of the flake graphite are Madagascar, China, Brazil, Ukraine, Canada, and the like. Major origins of amorphous graphite are the Korean Peninsula, China, Mexico, and the like.

Among these natural graphite, in general, amorphous graphite has a small particle diameter and a low purity. On the other hand, flake graphite and crystal line (vein) graphite have advantages such as high degree of graphitization and low impurity content, and thus can be advantageously used in the present invention.

Furthermore, examples of the artificial graphite include graphite particles, such as graphite particles of coke, needle coke, or high-density carbon materials, which are produced by subjecting a pitch material to high-temperature treatment.

Specific examples of the artificial graphite include substances obtained by subjecting an organic substance, such as a coal tar pitch, coal-based heavy oil, atmospheric residual oil, petroleum-based heavy oil, aromatic hydrocarbon, nitrogen-containing cyclic compound, sulfur-containing cyclic compound, polyphenylene, polyvinyl chloride, polyvinyl alcohol, polyacrylonitrile, polyvinyl butyral, natural polymer, polyphenylene sulfide, polyphenylene oxide, furfuryl alcohol resin, phenol-formaldehyde resin, and imide resin, to graphitization by calcining at a temperature typically in the range of 2500° C. to 3200° C.

As the graphite particles (C) used in the present invention, natural graphite, and artificial graphite, as well as coke powder, needle coke powder, and powders of graphite materials of resins or the like, and the like can be used as described above. Among these, natural graphite is preferable from the perspectives of high discharge capacity of the non-aqueous secondary battery and ease in production.

Spheroidizing Treatment of Graphite Particles (C)

The amorphous composite graphite particles (B) are preferably spherical from the perspectives of suppressing expansion and enhancing packing density when formed into an electrode. To obtain such amorphous composite graphite particles (B), a method in which spheroidizing treatment is performed to the graphite particles (C) is exemplified. The method of performing spheroidizing treatment will be described below; however, the method is not limited to this method.

As the device used for the spheroidizing treatment, for example, devices that repeatedly apply, to the particles, mechanical actions which mainly include impact force and also include compression, friction, shear force, and the like including interactions between graphite particles can be used.

Specifically, a device which has a rotor having a large number of blades disposed within a casing and in which the rotor is rotated at a high speed to exert a mechanical action, such as shock compression, friction, and shear force, on the graphite particles introduced into the casing, thereby performing a surface treatment, is preferable. Furthermore, a device that has a mechanism to repeatedly apply mechanical actions by circulating the graphite is preferable.

Examples of preferable devices that apply mechanical actions to the carbon material include Hybridization System (manufactured by Nara Machinery Co., Ltd.), Kryptron (manufactured by Earth Technica Co., Ltd.), CF mill (manufactured by Ube Industries, Ltd.), Mechanofusion System (manufactured by Hosokawa Micron Corporation), Theta Composer (manufactured by Tokuju Corporation), and the like. Among these, the Hybridization System, manufactured by Nara Machinery Co., Ltd., is preferable.

When the treatment is performed by using the device described above, for example, the circumferential speed of the rotating rotor is typically 30 m/sec to 100 m/sec, preferably 40 m/sec to 100 m/sec, and more preferably 50 m/sec to 100 m/sec. Furthermore, although the treatment of applying mechanical action to the graphite particles can be performed by simply passing the graphite through the device, the graphite is preferably treated by being circulated or retained within the device for 30 seconds or longer, and more preferably treated by being circulated or retained within the device for 1 minute or longer.

Compositing of Graphite Particles (C) and Amorphous Carbon

The amorphous composite graphite particles (B) used in the present invention are particles in which graphite particles (C) and an amorphous carbon are composited.

Note that "amorphous carbon" in the present invention refers to carbon having the d value of typically 0.34 nm or greater, and such carbon has a structure with a low crystallinity.

Specifically, the amorphous composite graphite particles (B) in which the graphite particles (C) and the amorphous carbon are composited can be obtained by using the similar method as in the step of coating the carbonaceous material to the Si composite carbon particles (A) described above. That is, the amorphous composite graphite particles (B) can be obtained by mixing the organic compound which becomes the carbonaceous material and the graphite particles (C) described above, and heat-treating the mixture.

In the heat treatment, the amorphous carbon can be obtained as a carbonaceous material by setting the calcination temperature to typically 600° C. or higher, preferably 700° C. or higher, and more preferably 900° C. or higher, but typically 2000° C. or lower, preferably 1500° C. or lower, and more preferably 1200° C. or lower. Furthermore, after the heat treatment, classification or disaggregation treatment may be performed appropriately.

Content of Amorphous Carbon

The content of the amorphous carbon in the amorphous composite graphite particles (B) used in the present invention is typically 0.01% by mass or greater, preferably 0.1% by mass or greater, even more preferably 0.3% or greater, and particularly preferably 0.7% by mass or greater, but typically 20% by mass or less, preferably 15% by mass or less, even more preferably 10% by mass or less, particularly preferably 7% by mass or less, and most preferably 5% by mass or less, relative to the amount of the graphite particles (C) which serve as the raw material.

When the content is too large, in the case where rolling is performed with sufficient pressure to achieve a high capacity in the non-aqueous secondary battery, the carbon material is damaged and material fracture is caused, and thus increase in charge/discharge irreversible capacity during initial cycle and lowering in initial efficiency tend to occur.

On the other hand, when the content is too small, it tends to be difficult to achieve the effect of coating. That is, side reactions with the electrolytic solution cannot be suppressed sufficiently in the battery, and thus increase in charge/discharge irreversible capacity during initial cycle and lowering in initial efficiency tend to occur.

Note that the content of the amorphous carbon derived from the organic compound that is finally obtained (coating proportion) can be calculated by the following formula (5) using the amount of the used graphite particles (C), the amount of the organic compound which becomes the carbonaceous material, and the proportion of the carbon residues measured by the Micro method in accordance with JIS K 2270.

$$\text{Content of amorphous carbon (\% by mass)} = \frac{(\text{mass of organic compound which becomes carbonaceous material} \times \text{proportion of carbon residue} \times 100)}{\{\text{sample (graphite particles (C))} + (\text{mass of organic compound which becomes carbonaceous material} \times \text{proportion of carbon residue})\}} \quad \text{Formula (5)}$$

Natural Graphite Particles (D)

The carbon material for negative electrodes of non-aqueous secondary batteries of the present invention preferably contains natural graphite particles (D) in addition to the Si composite carbon particles (A) and the amorphous composite graphite particles (B) from the perspectives of making it possible to suppress breakage of conductive path during charging and discharging of the non-aqueous secondary battery and suppressing decrease in the irreversible capacity. The natural graphite particles (D) will be described below.

Properties of the Natural Graphite Particles (D)

The natural graphite particles (D) of the present invention preferably have the following properties.

(a) X-Ray Parameters of Natural Graphite Particles (D)

The spacing between planes ($d_{002}$) of the 002 plane by wide-angle X-ray diffraction of the natural graphite particles (D) is typically 0.337 nm or less, and preferably 0.336 nm or less. Too large $d_{002}$ value indicates low crystallinity, and may increase initial irreversible capacity when a non-aqueous secondary battery is formed. On the other hand, since the theoretical value of the spacing between planes of the 002 plane of graphite is 0.3354 nm, the d value is typically 0.3354 nm or greater.

Furthermore, the crystallite size (Lc) of the natural graphite particles (D) is in the range of typically 30 nm or greater, preferably 50 nm or greater, and more preferably 100 nm or greater. When the crystallite size is less than this range, crystallinity is lowered, and the discharge capacity of the battery tends to be lowered. Note that the lower limit of the Lc is the theoretical value of graphite.

(b) Volume-Based Average Particle Diameter (d50) of Natural Graphite Particles (D)

The average particle diameter d50 of the natural graphite particles (D) is typically 50 μm or less, preferably 40 μm or less, more preferably 30 μm or less, and even more preferably 25 μm or less, but typically 1 μm or greater, preferably 4 μm or greater, and more preferably 7 μm or greater. When the average particle diameter d50 is too small, since decomposition of the electrolytic solution is increased due to increased specific surface area, initial efficiency of the non-aqueous secondary battery tends to be lowered. When the average panicle diameter d50 is too large, lowering in the rapid charge/discharge characteristics may occur.

(c) Aspect Ratio of Natural Graphite Particles (D)

The aspect ratio of the natural graphite particles (D) is typically 1 or greater, preferably 1.3 or greater, more preferably 1.4 or greater, and even more preferably 1.5 or greater, but typically 20 or less, preferably 10 or less, more preferably 8 or less, even more preferably 4 or less, and particularly preferably 2 or less.

When the aspect ratio is too large, since the particles tend to be arranged in the parallel direction relative to the current collector when formed into an electrode, continuous voids in the thickness direction of the electrode are not sufficiently ensured, and thus lithium ion mobility in the thickness direction is lowered and rapid charge/discharge characteristics of the non-aqueous secondary battery are likely to be lowered.

(d) BET Specific Surface Area (SA) of Natural Graphite Particles (D)

The specific surface area of the natural graphite particles (D) measured by the BET method is typically 0.5 $m^2/g$ or greater, preferably 1 $m^2/g$ or greater, more preferably 2 $m^2/g$ or greater, and even more preferably 3 $m^2/g$ or greater. Furthermore, the specific surface area is typically 15 $m^2/g$ or less, preferably 12 $m^2/g$ or less, more preferably 10 $m^2/g$ or less, even more preferably 8 $m^2/g$ or less, and particularly preferably 6 $m^2/g$ or less. If the specific surface area is too large, when the natural graphite particles (D) are used as a negative electrode active material, reactivity between an electrolytic solution and a portion exposed to the electrolytic solution is increased. Because of this, decrease in initial efficiency of the non-aqueous secondary battery and increase in amount of generated gas are easily caused, and thus it tends to be difficult to obtain a preferable battery. When the specific surface area is too small, the number of the sites where lithium ions move in and out becomes small, thereby making high-speed charge/discharge characteristics and output characteristics poor.

(e) Tap Density of Natural Graphite Particles (D)

The tap density of the natural graphite particles (D) is typically 0.5 $g/cm^3$ or greater, preferably 0.7 $g/cm^3$ or greater, more preferably 0.9 $g/cm^3$ or greater, and even more preferably 0.95 $g/cm^3$ or greater. Furthermore, the tap density is typically 1.8 $g/cm^3$ or less, preferably 1.5 $g/cm^3$ or less, and more preferably 1.3 $g/cm^3$ or less.

When the tap density is less than 0.5 $g/cm^3$, sufficient continuous voids are not ensured in the electrode and lithium ion mobility in the electrolytic solution held in voids is lowered, and thus rapid charge/discharge characteristics of the non-aqueous secondary battery are likely to be lowered.

(f) Roundness of Natural Graphite Particles (D)

The roundness of the natural graphite particles (D) is typically 0.75 or greater, preferably 0.80 or greater, more preferably 0.85 or greater, and even more preferably 0.90 or greater. Furthermore, the roundness is typically 1 or less, preferably 0.99 or less, more preferably 0.98 or less, and even more preferably 0.97 or less. When the roundness is too small, since the particles tend to be arranged in the parallel direction relative to the current collector when formed into an electrode, continuous voids in the thickness direction of the electrode are not sufficiently ensured, and thus lithium ion mobility in the thickness direction is lowered and rapid charge/discharge characteristics of the non-aqueous secondary battery are likely to be lowered. When the roundness is too large, lowering of the effect of suppressing breakage of conductive path and lowering of cycle characteristics tend to occur.

(g) Raman R Value of Natural Graphite Particles (D)

The Raman R value (defined as described above) of the natural graphite particles (D) is typically 1 or less, preferably 0.8 or less, more preferably 0.6 or less, and even more preferably 0.5 or less, but typically 0.05 or greater, preferably 0.1 or greater, more preferably 0.2 or greater, and even more preferably 0.25 or greater. When the Raman R value is less than this range, crystallinity of the particle surface becomes too high and the number of sites for inserting Li decreases, and rapid charge/discharge characteristics of the non-aqueous secondary battery are likely to be lowered. On the other hand, when the Raman R value is greater than this range, crystallinity of the particle surface is disordered and reactivity to the electrolytic solution increases, and thus lowering in charge/discharge efficiency and increase in generation of gas tend to occur.

(h) DBP Oil Absorption of Natural Graphite Particles (D)

The dibutyl phthalate (DBP) oil absorption of the natural graphite particles (D) is typically 110 mL/100 g or less, preferably 90 mL/100 g or less, more preferably 70 mL/100 g or less, and even more preferably 60 mL/100 g or less. Furthermore, the DBP oil absorption is typically 30 mL/100 g or greater, preferably 40 mL/100 g or greater, and more preferably 45 mL/100 g or greater. When the DBP oil absorption is too large, streak or the like during coating of a slurry containing the carbon material of the present invention tends to be caused when a negative electrode is formed. When the DBP oil absorption is too small, the particles may have almost no pore structures, and thus area for reacting with the electrolytic solution tends to be smaller.

Type of Natural Graphite Particles (D)

Examples of the natural graphite particles (D) used in the present invention include crystal line (vein) graphite, flake graphite, amorphous graphite, and the like. The origin of the crystal line (vein) graphite is mainly Sri Lanka. The origins of the flake graphite are Madagascar, China, Brazil, Ukraine, Canada, and the like. Major origins of amorphous graphite are the Korean Peninsula, China, Mexico, and the like.

Among these natural graphite, in general, amorphous graphite has a small particle diameter and a low purity. On the other hand, flake graphite and crystal line (vein) graphite have advantages such as high degree of graphitization and low impurity content, and thus can be advantageously used in the present invention.

Shape of Natural Graphite Particles (D)

The shape of the natural graphite particles (D) is not particularly limited, and the shape may be appropriately selected from flaky, fibrous, amorphous particle, or spherical. From the perspective of suppressing breakage of conductive path, the shape is preferably flaky.

Furthermore, the shape may be spherical from the perspectives of suppressing expansion and enhancing packing density when formed into an electrode. To obtain such natural graphite particles (D), a method that is similar to the method in which spheroidizing treatment is performed to the graphite particles (C) described above can be employed.

Carbon Material for Negative Electrodes of Non-Aqueous Secondary Batteries

The carbon material for negative electrodes of non-aqueous secondary batteries of the present invention is not particularly limited as long as the carbon material contains the Si composite carbon particles (A) and the amorphous composite graphite particles (B) described above; however, the carbon material preferably has the following properties.

Note that various properties of the carbon material of the present invention can be roughly estimated by obtaining weighted average of values of the corresponding properties of the Si composite carbon particles (A) and the amorphous composite graphite particles (B) as well as, if present, the natural graphite particles (D) and other raw materials described below that constitute the carbon material.

(a) X-Ray Parameters of Carbon Material for Negative Electrodes of Non-Aqueous Secondary Batteries The spacing between planes ($d_{002}$) of the 002 plane by wide-angle X-ray diffraction of the carbon material for negative electrodes of non-aqueous secondary batteries of the present invention is typically 0.337 nm or less, and preferably 0.336 nm or less. Too large $d_{002}$ value indicates low crystallinity, and may increase initial irreversible capacity when a non-aqueous secondary battery is formed. On the other hand, since the theoretical value of the spacing between planes of the 002 plane of graphite is 0.3354 nm, the d value is typically 0.3354 nm or greater.

Furthermore, crystallite size (Lc) of the carbon material for negative electrodes of non-aqueous secondary batteries of the present invention is in the range of typically 30 nm or greater, preferably 50 nm or greater, and more preferably 100 nm or greater. When the crystallite size is less than this range, crystallinity is lowered, and the discharge capacity of the battery tends to be lowered. Note that the lower limit of the Lc is the theoretical value of graphite.

(b) Volume-Based Average Particle Diameter (d50) of Carbon Material for Negative Electrodes of Non-Aqueous Secondary Batteries The average particle diameter d50 of the carbon material for negative electrodes of non-aqueous secondary batteries of the present invention is typically 50 μm or less, preferably 40 μm or less, more preferably 30 μm or less, even more preferably 25 μm or less, and particularly preferably 22 μm or less, but typically 1 μm or greater, preferably 5 μm or greater, more preferably 10 μm or greater, even more preferably 15 μm or greater, and particularly preferably 18 m or greater. When the average particle diameter d50 is too small, since decomposition of the electrolytic solution is increased due to increased specific surface area, initial efficiency of the non-aqueous secondary battery tends to be lowered. When the average particle diameter d50 is too large, lowering in the rapid charge/discharge characteristics may occur.

(c) Aspect Ratio of Carbon Material for Negative Electrodes of Non-Aqueous Secondary Batteries The aspect ratio of the carbon material for negative electrodes of non-aqueous secondary batteries of the present invention is typically 1 or greater, preferably 1.3 or greater, more preferably 1.4 or greater, and even more preferably 1.5 or greater, but typically 4 or less, preferably 3 or less, more preferably 2.5 or less, and even more preferably 2 or less.

When the aspect ratio is too large, since the particles tend to be arranged in the parallel direction relative to the current collector when formed into an electrode, continuous voids in the thickness direction of the electrode are not sufficiently ensured, and thus lithium ion mobility in the thickness direction is lowered and rapid charge/discharge characteristics of the non-aqueous secondary battery are likely to be lowered.

(d) BET Specific Surface Area (SA) of Carbon Material for Negative Electrodes of Non-Aqueous Secondary Batteries The specific surface area of the carbon material for negative electrodes of non-aqueous secondary batteries of the present invention measured by the BET method is typically 0.5 $m^2/g$ or greater, preferably 1 $m^2/g$ or greater, more preferably 3 $m^2/g$ or greater, even more preferably 5 $m^2/g$ or greater, and particularly preferably 8 $m^2/g$ or greater. Furthermore, the specific surface area is typically 30 $m^2/g$ or less, preferably 20 $m^2/g$ or less, more preferably 18 $m^2/g$ or less, even more preferably 16 $m^2/g$ or less, and particularly preferably 14 $m^2/g$ or less. If the specific surface area is too large, when the carbon material for negative electrodes of non-aqueous secondary batteries is used as a negative electrode active material, reactivity between an electrolytic solution and a portion exposed to the electrolytic solution is increased. Because of this, decrease in initial efficiency and increase in amount of generated gas are easily caused, and thus it tends to be difficult to obtain a preferable battery. When the specific surface area is too small, the number of the sites where lithium ions move in and out becomes small, thereby making high-speed charge/discharge characteristics and output characteristics poor.

(e) Roundness of Carbon Material for Negative Electrodes of Non-Aqueous Secondary Batteries The roundness of the carbon material for negative electrodes of non-aqueous secondary batteries of the present invention is typically 0.85 or greater, preferably 0.88 or greater, more preferably 0.89 or greater, and even more preferably 0.90 or greater. Furthermore, the roundness is typically 1 or less, preferably 0.99 or less, more preferably 0.98 or less, and even more preferably 0.97 or less. When the roundness is too small, since the particles tend to be arranged in the parallel direction relative to the current collector when formed into an electrode, continuous voids in the thickness direction of the electrode are not sufficiently ensured, and thus lithium ion mobility in the thickness direction is lowered and rapid charge/discharge characteristics of the non-aqueous secondary battery are likely to be lowered. When the roundness is too large, lowering of the effect of suppressing breakage of conductive path and lowering of cycle characteristics tend to occur.

(f) Raman R Value of Carbon Material for Negative Electrodes of Non-Aqueous Secondary Batteries The Raman R value (defined as described above) of the carbon material for negative electrodes of non-aqueous secondary batteries of the present invention is typically 1 or less, preferably 0.8 or less, more preferably 0.6 or less, and even more preferably 0.5 or less, but typically 0.05 or greater, preferably 0.1 or greater, more preferably 0.2 or greater, and even more preferably 0.25 or greater. When the Raman R value is less than this range, crystallinity of the particle surface becomes too high and the number of sites for inserting Li decreases, and rapid charge/discharge characteristics of the non-aqueous secondary battery are likely to be lowered. On the other hand, when the Raman R value is greater than this range, crystallinity of the particle surface is disordered and reactivity to the electrolytic solution increases, and thus lowering in charge/discharge efficiency and increase in generation of gas tend to occur.

(g) Tap Density of Carbon Material for Negative Electrodes of Non-Aqueous Secondary Batteries The tap density of the carbon material for negative electrodes of non-aqueous secondary batteries of the present invention is typically 0.6 g/cm$^3$ or greater, preferably 0.7 g/cm$^3$ or greater, more preferably 0.8 g/cm$^3$ or greater, even more preferably 0.9 g/cm$^3$ or greater, and particularly preferably 1.1 g/cm$^3$ or greater, but typically 1.8 g/cm$^3$ or lower, preferably 1.5 g/cm$^3$ or lower, more preferably 1.3 g/cm$^3$ or lower, and even more preferably 1.2 g/cm$^3$ or lower.

When the tap density is less than the range described above, sufficient continuous voids are not ensured in the electrode and lithium ion mobility in the electrolytic solution held in voids is lowered, and thus rapid charge/discharge characteristics of the non-aqueous secondary battery are likely to be lowered.

(h) DBP Oil Absorption

The dibutyl phthalate (DBP) oil absorption of the carbon material for negative electrodes of non-aqueous secondary batteries of the present invention is typically 65 mL/100 g or less, preferably 60 mL/100 g or less, more preferably 55 mL/100 g or less, and even more preferably 50 mL/100 g or less. Furthermore, the DBP oil absorption is typically 30 m/100 g or greater, preferably 40 mL/100 g or greater, and more preferably 42 mL/100 g or greater. When the DBP oil absorption is too large, streak or the like tends to be caused during coating of a slurry containing the carbon material of the present invention in forming a negative electrode. When the DBP oil absorption is too small, the particles may have almost no pore structures, and thus area for reacting with the electrolytic solution tends to be smaller.

Mass Proportions of Si Composite Carbon Particles (A) and Amorphous Composite Graphite Particles (B)

The mass proportion of the Si composite carbon particles (A) in the carbon material for negative electrodes of non-aqueous secondary batteries of the present invention is not particularly limited; for example, the mass proportion is greater than 0% by mass, preferably 1% by mass or greater, more preferably 10% by mass or greater, even more preferably 20% by mass or greater, and particularly preferably 30% by mass or greater, but typically 90% by mass or less, preferably 80% by mass or less, more preferably 70% by mass or less, even more preferably 60% by mass or less, and particularly preferably 50% by mass or less.

When the proportion of the Si composite carbon particles (A) in the carbon material for negative electrodes of non-aqueous secondary batteries is too large, lowering in initial efficiency of the non-aqueous secondary battery and lowering in electrode plate strength may be caused. When the proportion of the Si composite carbon particles (A) is too small, reduction in capacity tends to occur.

The mass proportion of the amorphous composite graphite particles (B) in the carbon material for negative electrodes of non-aqueous secondary batteries of the present invention is not particularly limited; for example, the mass proportion is greater than 0% by mass, preferably 1% by mass or greater, more preferably 10% by mass or greater, even more preferably 20% by mass or greater, and particularly preferably 30% by mass or greater, but typically 90% by mass or less, preferably 80% by mass or less, more preferably 70% by mass or less, even more preferably 60% by mass or less, and particularly preferably 50% by mass or less.

When the proportion of the amorphous composite graphite particles (B) in the carbon material for negative electrodes of non-aqueous secondary batteries of the present invention is too large, reduction in capacity of the non-aqueous secondary battery tends to occur. Furthermore, when the proportion of the amorphous composite graphite particles (B) is too small, reduction in input/output characteristics tends to occur due to decrease in overvoltage suppressing effect.

Furthermore, the carbon material for negative electrodes of non-aqueous secondary batteries of the present invention preferably contains the natural graphite particles (D). The mass proportion of the natural graphite particles (D) in the carbon material for negative electrodes of non-aqueous secondary batteries is not particularly limited; for example, the mass proportion is typically 0% by mass or greater, preferably 1% by mass or greater, more preferably 10% by mass or greater, even more preferably 20% by mass or greater, and particularly preferably 30% by mass or greater, but typically 90% by mass or less, preferably 80% by mass or less, more preferably 70% by mass or less, even more preferably 60% by mass or less, and particularly preferably 50% by mass or less.

When the proportion of the natural graphite particles (D) in the carbon material for negative electrodes of non-aqueous secondary batteries is too large, input/output characteristics tend to be lowered since the capacity of the non-aqueous secondary battery tends to be reduced and the active material is deformed during pressing thereby blocking the flow path of the non-aqueous electrolytic solution. Furthermore, when the proportion of the natural graphite particles (D) is too small, lowering of cycle characteristics tends to occur due to reduction in effect of suppressing breakage of conductive path.

Furthermore, the total amount of the Si composite carbon particles (A), the amorphous composite graphite particles (B), and the natural graphite particles (D) does not exceed 100% by mass.

Note that, to obtain the carbon material of the present invention, the method of mixing these carbon materials is not particularly limited as long as these are uniformly mixed. For example, as the mixing device of the batch method, a mixer having a structure wherein two frames each are revolved while rotating; a device having a structure wherein one blade performs agitation and dispersing within a tank, such as a dissolver which is a high-speed high-shear mixer or a butterfly mixer for high viscosity; a device of so-called kneader type having a structure wherein a stirring blade of the sigma type or the like is rotated along the sidewall of a semicylindrical mixing vessel; a device of the tri-mixing type which includes stirring blades arranged on three axes; a device of the so-called bead mill type which includes a rotating disk and a dispersion medium both disposed in a vessel, and the like are used.

Furthermore, a device having a structure which includes a vessel equipped inside with a plurality of paddles rotated by shafts and in which the inner wall surface of the vessel has been formed substantially along the outer periphery of the rotating paddles preferably in a long double-barrel shape and the paddles have been arranged in pairs along the axial directions of the shafts so that the opposed surfaces of each pair of paddles occlude slidably (e.g., KRC Reactor and SC Processor, both manufactured by Kurimoto, Ltd., TEM, manufactured by Toshiba Machine Selmac Co., Ltd., TEX-K, manufactured by The Japan Steel Works, Ltd., and the like); and a device (external heating type) having a structure which includes a vessel equipped with one shaft inside and with a plurality of plow-shaped or serrate paddles fixed to the shaft so as to be disposed in different phases and in which the inner wall surface thereof has been formed substantially along the outer periphery of the rotating paddles preferably in a cylindrical shape (e.g., Loedige Mixer, manufactured by Loedige GmbH, Flow Shear Mixer, manufactured by Pacific Machinery & Engineering Co., Ltd., DT Dryer, manufactured by Tsukishima Kikai Co., Ltd., and the like) can be also used. To perform the mixing via the continuous method, a pipeline mixer, a continuous bead mill, or the like can be used.

Mixing with Other Raw Materials

The carbon material for negative electrodes of non-aqueous secondary batteries of the present invention can be suitably used as a negative electrode material of a non-aqueous secondary battery by combining the raw materials described above at any composition and in any combination; however, the carbon material may be used as a non-aqueous secondary battery, and preferably as a negative electrode raw material of a non-aqueous secondary battery, by mixing with one type or two or more types of other raw materials that are not the raw materials described above.

When such other raw materials are blended, the mixed amount of the other raw materials is typically 10% by mass or greater, preferably 30% by mass or greater, more preferably 50% by mass or greater, even more preferably 60% by mass or greater, and particularly preferably 70% by mass or greater, relative to the total amount of the carbon material for negative electrodes of non-aqueous secondary batteries. Furthermore, the mixed amount is typically 99% by mass or less, preferably 95% by mass or less, more preferably 90%/o by mass or less, even more preferably 85% by mass or less, and particularly preferably 80% by mass or less.

When the mixing proportion of the other raw materials is below the range described above, it tends to be difficult to exhibit the effect of adding. On the other hand, when the mixing proportion is above the range described above, it tends to be difficult to exhibit characteristics of the carbon material for negative electrodes of non-aqueous secondary batteries of the present invention.

As the other raw materials, for example, raw materials selected from resins, artificial graphite, amorphous carbon, metal particles, or metal compounds can be used. Any one type of these raw materials may be used alone, or any combination or composition of two or more types of these may be used.

Blending of the resin to the carbon material of the present invention is exemplified for the purpose of reducing the reactivity between the negative electrode raw material and the non-aqueous electrolytic solution, or the like. As the resin, water-soluble polymers are preferable from the perspective of suppressing the solubility to the non-aqueous electrolytic solution.

Examples of the artificial graphite include particles in which a carbon material is graphitized, or the like. For example, particles obtained by calcining and graphitizing homogeneous graphite precursor particles as is in powder form, or the like can be used.

As the amorphous carbon, for example, particles obtained by calcining bulk mesophase, and particles obtained by subjecting carbonizable pitch or the like to infusibilization treatment and calcination can be used.

The device used for mixing the essential components of the carbon material for negative electrodes of non-aqueous secondary batteries with other raw materials is not particularly limited; however, examples thereof include the following.

In the case of a rotary mixer: cylindrical mixer, twin cylindrical mixer, double conical mixer, cube mixer, and hoe-type mixer.

In the case of a fixed mixer: a helical mixer, ribbon mixer, Muller mixer, Helical Flight mixer, Pugmill mixer, and fluidizing mixer.

Preferable examples of the metal particles include a metal selected from the group consisting of Fe, Co, Sb, Bi, Pb, Ni, Ag, Si, Sn, As, Al, Zr, Cr, P, S, V, Mn, Nb, Mo, Cu, Zn, Ge, In, Ti, and the like, and compounds thereof. Furthermore, an alloy formed from two or more types of metals may also be used, and the metal particle may be an alloy particle formed from two or more types of metal elements. Among these, a metal selected from the group consisting of Si, Sn, As, Sb, Al, Zn, W, and compounds thereof is preferable.

Examples of the metal compound include metal oxides, metal nitrides, metal carbides, and the like. Furthermore, an alloy formed from two or more types of metals may also be used.

Among these, a Si compound is preferable. As the Si compound, a substance that is the same as the Si compound in the Si composite carbon particles (A) can be used.

Negative Electrode for Non-Aqueous Secondary Batteries

The present invention also relates to a negative electrode for non-aqueous secondary batteries formed by using the carbon material for negative electrodes of non-aqueous secondary batteries of the present invention, and a specific example is a negative electrode for lithium ion secondary batteries.

The method of producing the negative electrode for non-aqueous secondary batteries and selection of raw materials, other than the carbon material for negative electrodes of non-aqueous secondary batteries of the present invention, that constitute the negative electrode for non-aqueous secondary batteries are not particularly limited.

The negative electrode for non-aqueous secondary batteries of the present invention comprises a current collector and an active material layer formed on the current collector, and the active material layer contains the carbon material for negative electrodes of non-aqueous secondary batteries of the present invention. The active material layer preferably further contains a binder.

Although the binder is not particularly limited, a binder having an olefinic unsaturated bond in a molecule is preferable. Specific examples include styrene-butadiene rubber, styrene/isoprene/styrene rubber, acrylonitrile-butadiene rubber, butadiene rubber, ethylene/propylene/diene copolymer, and the like.

By using such a binder having an olefinic unsaturated bond in a molecule, swellability of the active material layer to the electrolytic solution can be reduced. Among these, styrene-butadiene rubber is preferable since it is easily obtained.

By using a combination of such a binder having an olefinic unsaturated bond in a molecule and the carbon material for negative electrodes of non-aqueous secondary batteries of the present invention, high mechanical strength of the negative electrode plate can be achieved. When the mechanical strength of the negative electrode plate is high, deterioration in the negative electrode due to charging and discharging of the non-aqueous secondary battery can be suppressed, and the cycle life can be extended.

The binder having an olefinic unsaturated bond in a molecule is preferably a binder having a large molecular weight and/or a large proportion of unsaturated bond.

As the molecular weight of the binder, the weight average molecular weight of typically 10,000 or greater can be employed, and typically 1,000,000 or less can be employed. When the molecular weight is within this range, both the mechanical strength and flexibility can be controlled to be within preferable ranges. The weight average molecular weight is preferably in the range of 50,000 to 300,000.

As the proportion of the olefinic unsaturated bond in a molecule of the binder, the number of moles of the olefinic unsaturated bond per 1 g of the entire binder can be set to typically $2.5 \times 10^{-7}$ moles or greater, and typically $5 \times 10^{-6}$ moles or less. When the number of moles is within this range, effect of enhancing the strength can be sufficiently achieved and flexibility becomes excellent. The number of moles is preferably $8 \times 10^{-7}$ moles or greater, and preferably $1 \times 10^{-6}$ moles or less.

Furthermore, the degree of unsaturation of the binder having an olefinic unsaturated bond in a molecule can be typically set to 15% to 90%. The degree of unsaturation is preferably 20% or greater, and more preferably 40% or greater, and preferably 80% or less. In the description of the present application, "degree of unsaturation" refers to the proportion (%) of double bonds relative to a repeating unit of a polymer.

As to the binder, a binder having no olefinic unsaturated bond in a molecule can also be used. By using a binder having an olefinic unsaturated bond in a molecule and a binder having no olefinic unsaturated bond in a molecule together, enhancement in coatability and the like can be expected.

In the case where the amount of the binder having an olefinic unsaturated bond in a molecule is 100% by mass, the mixed proportion of the binder having no olefinic unsaturated bond in a molecule can be set to typically 150% by mass or less, and preferably 120% by mass or less, to suppress reduction in the active material layer strength.

Examples of the binders having no olefinic unsaturated bond in a molecule include thickening polysaccharides, such as methyl cellulose, carboxymethyl cellulose, starches, carrageenan, pullulan, guar gum, xanthan gum, and the like;

polyethers, such as polyethylene oxide, polypropylene oxide, and the like;

vinyl alcohols, such as polyvinyl alcohol, polyvinyl butyral, and the like;

polyacids, such as polyacrylic acid, polymethacrylic acid, and the like, and metal salts of these;

fluorine-containing polymers, such as polyvinylidene fluoride and the like;

alkane-based polymers, such as polyethylene, polypropylene, and the like, and copolymers of these; and the like.

The active material layer in the negative electrode for non-aqueous secondary batteries of the present invention may contain a conductive auxiliary agent to enhance the electrical conductivity of the negative electrode. The conductive auxiliary agent is not particularly limited, and examples thereof include carbon black, such as acetylene black, Ketjen black, and furnace black, fine powders of Cu, Ni, or alloy of these having the average particle diameter of 1 μm or less, and the like.

The added amount of the conductive auxiliary agent is preferably 10 parts by mass or less per 100 parts by mass of the carbon material for negative electrodes of non-aqueous secondary batteries of the present invention.

The negative electrode for non-aqueous secondary batteries of the present invention can be formed by preparing a slurry by dispersing the carbon material for negative electrodes of non-aqueous secondary batteries of the present invention, and occasionally a binder and/or a conductive auxiliary agent in a dispersion medium, applying the slurry to a current collector, and then drying. As the dispersion medium, organic solvents, such as alcohols, and water can be used.

The current collector on which the slurry is coated is not particularly limited, and publicly known current collectors can be used. Specific examples include metal thin films, such as rolled copper foil, electrolytic copper foil, and stainless steel foil, and the like.

The thickness of the current collector can be set to typically 4 μm or greater, but typically 30 μm or less. The thickness is preferably 6 μm or greater, but preferably 20 μm or less.

From the perspectives of practicability as the negative electrode and functions of occlusion and release of lithium ions that are sufficient for high density of current, the thickness of the active material layer obtained by coating and drying the slurry can be set to typically 5 μm or greater, but typically 200 μm or less. The thickness is preferably 20 μm or greater, and more preferably 30 μm or greater, but preferably 100 μm or less, and more preferably 75 μm or less.

The thickness of the active material layer can be adjusted by pressing after the coating and drying of the slurry in a manner that the thickness is within the range described above.

The density of the carbon material for negative electrodes of non-aqueous secondary batteries in the active material layer varies depending on the purpose of use; for example, for the uses in which input/output characteristics are important, such as the use for vehicles or for power tool, the density is typically 1.1 g/cm$^3$ or greater but 1.65 g/cm$^3$ or less. When the density is within this range, increase in contact resistance between the particles due to too low density can be avoided. Meanwhile, lowering in rate characteristics due to too high density can be suppressed.

The density is preferably 1.2 g/cm$^3$ or greater, and more preferably 1.25 g/cm$^3$ or greater.

For the uses in which capacity is important, such as the use for mobile devices including mobile phones and computers, the density can be set to typically 1.45 g/cm$^3$ or greater but typically 1.9 g/cm$^3$ or less.

When the density is within this range, decrease in capacity per unit volume of the battery due to too low density can be avoided. Meanwhile, lowering in rate characteristics due to too high density can be suppressed.

The density is preferably 1.55 g/cm$^3$ or greater, more preferably 1.65 g/cm$^3$ or greater, and particularly preferably 1.7 g/cm$^3$ or greater.

Non-Aqueous Secondary Battery

The basic structure of the non-aqueous secondary battery according to the present invention can be, for example, the same as those of publicly known lithium ion secondary batteries. The non-aqueous secondary battery according to the present invention typically comprises a positive electrode and a negative electrode that are capable of occluding and releasing lithium ions, and an electrolyte, and the negative electrode is the negative electrode for non-aqueous secondary batteries according to the present invention described above.

Positive Electrode

The positive electrode can comprise a current collector and an active material layer formed on the current collector. The active material layer preferably contains a binder in addition to the active material for the positive electrode.

Examples of the active material for the positive electrode include metal chalcogen compounds that can occlude and release alkali metal cations, such as lithium ions, during charging and discharging, and the like. Among these, metal chalcogen compounds that can occlude and release lithium ions are preferable.

Examples of the metal chalcogen compound include transition metal oxides, such as vanadium oxides, molybdenum oxides, manganese oxides, chromium oxides, titanium oxides, and tungsten oxides;

transition metal sulfides, such as vanadium sulfides, molybdenum sulfides, titanium sulfides, and CuS;

phosphorus-sulfur compounds of transition metals, such as NiPS$_3$ and FePS$_3$;

selenium compounds of transition metals, such as VSe$_2$ and NbSe$_3$;

composite oxides of transition metals, such as Fe$_{0.25}$V$_{0.75}$S$_2$ and Na$_{0.1}$CrS$_2$;

composite sulfides of transition metals, such as LiCoS$_2$ and LiNiS$_2$; and the like.

Among these, from the perspective of occluding and releasing lithium ions, V$_2$O$_5$, V$_5$O$_{13}$, VO$_2$, Cr$_2$O$_5$, MnO$_2$, TiO$_2$, MoV$_2$O$_8$, LiCoO$_2$, LiNiO$_2$, LiMn$_2$O$_4$, TiS$_2$, V$_2$S$_5$, Cr$_{0.25}$V$_{0.75}$S$_2$, Cr$_{0.5}$V$_{0.5}$S$_2$, and the like are preferable, and LiCoO$_2$, LiNiO$_2$, LiMn$_2$O$_4$, and lithium transition metal composite oxides in which a part of these transition metals is substituted with another metal are particularly preferable.

One type of these positive electrode active materials may be used alone, or a plurality of these may be combined for use.

The binder for the positive electrode is not particularly limited, and publicly known binders can be appropriately selected for use. Examples thereof include inorganic compounds, such as silicate and waterglass, resins that have no unsaturated bond, such as Teflon (registered trademark) and polyvinylidene fluoride, and the like. Among these, resins that have no unsaturated bond are preferable since such resins are not easily decomposed during oxidation reactions.

The weight average molecular weight of the binder can be set to typically 10,000 or greater but typically 3,000,000 or less. The weight average molecular weight is preferably 100,000 or greater but preferably 1,000,000 or less.

The positive electrode active material layer may contain a conductive auxiliary agent to enhance the electrical conductivity of the positive electrode. The conductive auxiliary agent is not particularly limited, and examples thereof include carbon powders of acetylene black, carbon black, graphite, or the like, various metal fibers, powders, foils, and the like.

In the present invention, the positive electrode can be formed by the production method similar to that of the negative electrode described above, and the positive electrode can be formed by preparing a slurry by dispersing the active material, and occasionally a binder and/or a conductive auxiliary agent in a dispersion medium, and then applying the slurry to a current collector. The current collector of the positive electrode is not particularly limited, and examples thereof include aluminum, nickel, stainless steel (SUS), and the like.

Electrolyte

The electrolyte (also referred to as "electrolytic solution") is not particularly limited, and examples thereof include non-aqueous electrolytic solutions obtained by dissolving a lithium salt as an electrolyte in a non-aqueous solvent, and electrolytes that are formed into gel-like, gum-like, or solid sheet-like by adding an organic polymer compound or the like to the non-aqueous electrolytic solution, and the like.

The non-aqueous solvent used in the non-aqueous electrolytic solution is not particularly limited, and publicly known non-aqueous solvent can be used.

Examples thereof include chain carbonates, such as diethyl carbonate, dimethyl carbonate, and ethyl methyl carbonate;

cyclic carbonates, such as ethylene carbonate, propylene carbonate, and butylene carbonate;

chain ethers, such as 1,2-dimethoxyethane;

cyclic ethers, such as tetrahydrofuran, 2-methyltetrahydrofuran, sulfolane, and 1,3-dioxolane;

chain esters, such as methyl formate, methyl acetate, and methyl propionate;

cyclic esters, such as γ-butyrolactone and γ-valerolactone; and the like.

The non-aqueous solvent may be used alone, or two or more types of these may be used in combination. In the case of a mixed solvent, a combination of the mixed solvent containing a cyclic carbonate and a chain carbonate is preferable from the perspective of the balance of electrical conductivity and viscosity, and the cyclic carbonate is preferably ethylene carbonate.

The lithium salt used in the non-aqueous electrolytic solution is not particularly limited, and publicly known lithium salt can be used. For example, halides, such as LiCl and LiBr;

perhalogenates, such as LiClO$_4$, LiBrO$_4$, and LiClO$_4$;

inorganic lithium salts, such as inorganic fluoride salts including LiPF$_6$, LiBF$_4$, LiAsF$_6$, and the like;

perfluoroalkanesulfonates, such as LiCF$_3$SO$_3$ and LiC$_4$F$_9$SO$_3$;

fluorine-containing organic lithium salts, such as imide salts of perfluoroalkanesulfonic acid including Li trifluoromethanesulfonyl imide ((CF$_3$SO$_2$)$_2$NLi); and the like can be used. Among these, LiClO$_4$, LiPF$_6$, and LiBF$_4$ are preferable.

The lithium salt may be used alone, or two or more types of these may be used in combination. The concentration of the lithium salt in the non-aqueous electrolytic solution can be set to the range of 0.5 mol/L to 2.0 mol/L.

In the case where the non-aqueous electrolytic solution described above is used after being formed into gel-like, gum-like, or solid sheet-like by adding an organic polymer compound, specific examples of the organic polymer compound include polyether-based polymer compounds, such as polyethylene oxide and polypropylene oxide;

crosslinked polymers of polyether-based polymer compounds;

vinyl alcohol-based polymer compounds, such as polyvinyl alcohol and polyvinyl butyral;

insolubilized substances of vinyl alcohol-based polymer compounds;

polyepichlorohydrin;

polyphosphazene;

polysiloxane;

vinyl-based polymer compounds, such as polyvinylpyrrolidone, polyvinylidene carbonate, and polyacrylonitrile;

copolymers, such as poly($\Omega$-methoxyoligooxyethylene methacrylate), poly($\Omega$-methoxyoligooxyethylene methacrylate-co-methylmethacrylate), and poly(hexafluoropropylene-vinylidene fluoride); and the like.

The non-aqueous electrolytic solution described above may further contain a film-forming agent.

Specific examples of the film-forming agent include carbonate compounds, such as vinylene carbonate, vinyl ethyl carbonate, and methyl phenyl carbonate;

alkene sulfides, such as ethylene sulfide and propylene sulfide;

sultone compounds, such as 1,3-propane sultone and 1,4-butane sultone;

acid anhydrides, such as maleic anhydride and succinic anhydride; and the like.

An overcharge inhibitor, such as diphenyl ether and cyclohexylbenzene, may be further added to the non-aqueous electrolytic solution.

In the case where various additives described above are used, to avoid adverse effect on other battery characteristics, such as increase in initial irreversible capacity and lowering in low temperature characteristics and rate characteristics, the total content of the additives can be set to typically 10% by mass or less relative to the total amount of the non-aqueous electrolytic solution. In particular, the content is preferably 8% by mass or less, more preferably 5% by mass or less, and particularly preferably 2% by mass or less.

Furthermore, solid polymer electrolyte which is an electric conductor of alkali metal cations, such as lithium ions, can be used as the electrolyte.

Examples of the solid polymer electrolyte include the polyether-based polymer compound described above in which a Li salt is dissolved, and polymers comprising polyethers in which a terminal hydroxy group is converted to an alcoxide, or the like.

Other

Typically, a porous separator such as a porous membrane or nonwoven fabric can be disposed between the positive electrode and the negative electrode to prevent short circuit between the electrodes, and it is convenient to use the non-aqueous electrolytic solution by impregnating with the porous separator. As the raw material of the separator, polyolefins such as polyethylene and polypropylene, polyethersulfones, and the like are used, and polyolefin is preferable.

The form of the non-aqueous secondary battery is not particularly limited, and examples thereof include cylinder-type in which sheet electrodes and the separator are provided in a spiral;

cylinder-type with an inside-out structure in which pellet electrodes and the separator are combined;

coin-type in which pellet electrodes and the separator are laminated; and the like.

Furthermore, by placing the battery in such a form in any outer case, the battery can be used in any form, such as coin-type, cylinder-type or square-type, and in any size.

The procedure for assembling the non-aqueous secondary battery is not particularly limited, and the non-aqueous secondary battery can be assembled with an appropriate procedure based on the battery structure. For example, the negative electrode is placed in the outer case, the electrolytic solution and the separator are provided thereon, the positive electrode is placed thereon in a manner that the positive electrode faces the negative electrode, and the battery is produced by swaging with a gasket and a sealing plate.

By using the carbon material for negative electrodes of non-aqueous secondary batteries of the present invention, a non-aqueous secondary battery having excellent stability, a high output, a high capacity, a small irreversible capacity, and an excellent cycle maintenance ratio can be provided.

EXAMPLES

Specific aspects of the present invention will be further described below in detail using examples; however, the present invention is not limited to these examples. Note that the measurement method of each physical property and the like are as described below.

Method of Measuring Average Particle Diameter d50

The method of measuring the average particle diameter d50 is as described below. In 10 mL of 0.2% by mass aqueous solution of polyoxyethylene sorbitan monolaurate (e.g., Tween 20 (registered trademark)) which was a surfactant, 0.01 g of sample was suspended and then irradiated with ultrasonic wave of 28 kHz at an output of 60 W for 1 minute using a commercially available laser diffraction/scattering particle size distribution measuring device, LA-920 manufactured by Horiba, Ltd. Thereafter, the value measured as a volume-based median diameter using the measurement device was defined as the average particle diameter d50 in the present invention.

Method of Measuring BET Specific Surface Area (SA)

The BET specific surface area (SA) was measured by the single point BET method via a nitrogen gas adsorption-flow method using a specific surface area measurement device, AMS 8000 manufactured by Okura Riken K.K. Specifically, 0.4 g of sample was filled in a cell and pre-treated by heating to 350° C., and then cooled to the liquid nitrogen temperature to allow saturated adsorption of a gas containing 30% nitrogen and 70% He. Thereafter, the sample was heated to room temperature to measure the amount of released gas. From the obtained result, the specific surface area was calculated by the ordinary BET method.

Raman R Value

The sample to be measured was filled by dropping into a measurement cell by gravity, and then the measurement was performed by irradiating the measurement cell with an argon-ion laser beam while the measurement cell was being rotated within the plane perpendicular to this laser beam. The measurement conditions of the Raman spectrum are shown below.

Raman spectrometer: Raman spectrometer, manufactured by JASCO Corporation

Wavelength of argon-ion laser beam: 514.5 nm

Laser power on sample: 25 mW

Optical resolution: 4 $cm^{-1}$

Measured range: 1100 $cm^{-1}$ to 1730 $cm^{-1}$

Peak intensity measurement, peak half width measurement: background process, smoothing process (convolution by simple average: 5 points)

For the obtained Raman spectrum, the intensity $I_A$ of the peak $P_A$ around 1580 cm$^{-1}$ and the intensity $I_B$ of the peak $P_B$ around 1360 cm$^{-1}$ were measured and then the intensity ratio R (R=$I_B/I_A$) was calculated to obtain the Raman R value.

Tap Density

The method of measuring the tap density is as described below. The tap density was defined as a density determined by dropping a sample into a cylindrical tap cell having a diameter of 1.6 cm and a volume of 20 cm$^3$ through a sieve having a sieve opening of 300 μm to fully fill the cell, then performing 1000 times of tapping with a stroke length of 10 mm, and measuring the volume and the mass of the sample at this time to determine the density using a powder density measurement device.

DBP Oil Absorption

The DBP oil absorption was defined by a value measured by placing 40 g of material to be measured, and using the following conditions: dropping rate of 4 mL/min, rotation speed of 125 rpm, and set torque of 500 N·m, in accordance with JIS K6217. For the measurement, an absorption measurement device (S-500), manufactured by Asahisouken Co., Ltd., was used.

Si Content of Composite Carbon Particles

The Si content of the composite carbon particles was determined as described below. After composite carbon particles were completely dissolved with an alkali, the mixture was dissolved in water to a predetermined volume. Then, the sample was measured using an inductively coupled plasma optical emission spectrometer (ULTIMA2C, manufactured by Horiba, Ltd.) to calculate the amount of Si from a calibration curve. Thereafter, by dividing the amount of Si by the weight of the composite carbon particles, the content of Si in the composite carbon particles was calculated.

Observation of Cross Section Structure of Composite Carbon Particles

The cross section structure of composite carbon particles was measured as described below. An electrode plate produced in the "Production of electrode sheet" described below was processed using the Cross section polisher (IB-09020CP, manufactured by JEOL Ltd.) to obtain an electrode plate cross section. While the obtained electrode plate cross section was being observed using an SEM (SU-70, manufactured by Hitachi High-Technologies Corporation), mapping of graphite and Si was performed using an EDX. Note that the SEM acquisition conditions included an accelerating voltage of 3 kV and a magnification of 2,000 times, and an image having an area capable of acquisition of one particle was obtained at a resolution of 256 dpi.

Initial Discharge Capacity, Initial Efficiency

Using a non-aqueous secondary battery (2016 coin-type battery) produced by the method described below, capacities during charging and discharging of the battery were measured by the measurement method described below.

Charging was performed to 5 mV relative to a lithium counter electrode at a current density of 0.05 C (the value of current at which the rated capacity in terms of 1-hour-rate discharge capacity is discharged over 1 hour is referred to as 1 C; the same applies hereinafter), and then further charging was performed at a constant voltage of 5 mV until the current density reached 0.005 C. After lithium is doped into the negative electrode, discharging was performed to 1.5 V relative to the lithium counter electrode at a current density of 0.1 C. The discharge capacity (mAh/g) at this time was used as the discharge capacity (mAh/g) of the tested carbon material, and the difference between the charge capacity (mAh/g) and the discharge capacity (mAh/g) was used as the irreversible capacity (mAh/g). Furthermore, here, the obtained discharge capacity (mAh/g) was divided by the charge capacity (mAh/g) of the first cycle and then multiplied by 100, and this value was used as the initial efficiency (%).

Input/Output Resistance

In an environment at 25° C., charging was performed at a constant current of 0.2 C for 150 minutes, and then the sample was stored in a thermostatic chamber at 25° C. for 3 hours or longer. Thereafter, discharging and charging at 0.25 C, 1.00 C, 3.00 C, and 4.50 C were performed for 10 seconds each, and the voltages at the ten seconds were measured.

The slope of the current-voltage line obtained by the measurements was used as the input/output resistance (Ω).

Cycle Characteristics

Using a laminate-type non-aqueous secondary battery produced by the method of producing a non-aqueous secondary battery described below, cycle characteristics were measured by the measurement method described below.

For a non-aqueous secondary battery that had not undergone charge/discharge cycle, initial charging and discharging, including 3 cycles in a voltage range of 4.1 V to 3.0 V at a current value of 0.2 C, and 2 cycles in a voltage range of 4.2 V to 3.0 V at a current value of 0.2 C (during charging, charging at a constant voltage of 4.2 V was further performed for 2.5 hours) were performed at 25° C.

Furthermore, 10 cycles of charging and discharging were performed in a voltage range of 4.2 V to 3.0 V at a current value of 2.0 C at 60° C., and then a value calculated by dividing the discharge capacity at the tenth cycle by the discharge capacity at the first cycle was obtained as the discharge capacity maintenance ratio (cycle maintenance ratio).

Production of Electrode Sheet

Using a carbon material (negative electrode raw material) of the working example or comparative example, an electrode plate having an active material layer with the active material layer density of 1.6±0.03 g/cm$^3$ was produced. Specifically, to 20.00±0.02 g of the negative electrode raw material, 20.00±0.02 g (0.200 g in terms of solid content) of 1% by mass carboxymethyl cellulose sodium salt aqueous solution and 0.75±0.05 g (0.3 g in terms of solid content) of styrene/butadiene rubber of weight average molecular weight of 270,000 aqueous dispersion were added and stirred for 5 minutes using the Hybrid Mixer, manufactured by Keyence Corporation, and then degassed for 30 seconds to obtain a slurry.

This slurry was applied 5 cm wide on copper foil having a thickness of 18 μm, which was a current collector, using a doctor blade in a manner that the negative electrode material was attached at 12.0±0.3 mg/cm$^2$, and air-dried at room temperature. Further drying was performed at 110° C. for 30 minutes, and then roll press was performed using a roller having a diameter of 20 cm to adjust the density of the active material layer to be 1.60±0.03 g/cm$^3$. Thereby, an electrode sheet was obtained.

Production of Non-Aqueous Secondary Battery (2016 Coin-Type Battery)

The electrode sheet produced by the method described above was punched out in a disk shape having a diameter of 12.5 mm, and lithium metal foil was punched out in a disk shape having a diameter of 14 mm and used as a counter electrode. In between these electrodes, a separator (formed from porous polyethylene film) impregnated with an electrolytic solution, in which LiPF$_6$ was dissolved in a mixed solvent of ethylene carbonate and ethyl methyl carbonate (volume ratio=3:7) in a manner that the concentration was 1 mol/L, was placed to produce a 2016 coin-type battery.

Production of Non-Aqueous Secondary Battery (Laminated Cell)

Lithium nickel manganese cobalt oxide ($LiNi_{1/3}Mn_{1/3}Co_{1/3}O_2$) was used as a positive electrode active material. To this, a conductive agent and polyvinylidene fluoride (PVdF) as a binder were mixed to form a slurry. The obtained slurry was coated on aluminum foil having a thickness of 15 µm, dried, rolled by a pressing machine, and cut into a shape that had a size of 30 mm width and 40 mm length of a positive electrode active material layer and that had an uncoated portion for current collection, to form a positive electrode. The density of the positive electrode active material layer was 2.6 g/cm³.

As the negative electrode, the electrode sheet produced by the method described above was cut into a shape that had a negative electrode active material layer having a size of 32 mm width and 42 mm length and that had an uncoated portion as the current collector tab joint, and used. At this time, the density of the negative electrode active material layer was 1.35 g/cm³.

The positive electrode and the negative electrode were arranged in a manner that the active material faces were facing each other, and in a manner that a separator of porous polyethylene sheet was sandwiched in between the electrodes. At this time, positive electrode active material face was arranged so that it did not escape from the area of the negative electrode active material face.

A current collector tab was welded to each of the uncoated portions of the positive electrode and the negative electrode to prepare an electrode body. Using a laminate sheet of a polypropylene film, aluminum foil having a thickness of 0.04 mm, and a nylon film as laminated in this order (total thickness: 0.1 mm), the electrode body was sheathed by the laminate sheet in a manner that the polypropylene film was located inside, and it was heat-sealed in the regions where the electrode did not exist except one side of inlet for electrolytic solution.

Thereafter, 200 µL of non-aqueous electrolytic solution (prepared by dissolving lithium hexafluorophosphate ($LiPF_6$) in ethylene carbonate (EC)/dimethyl carbonate (DMC)/ethyl methyl carbonate (EMC)=3/3/4 (volume ratio) to have a concentration of 1.2 mol/L) was injected to the active material layer to fully infiltrate into the electrodes, and then sealed to produce a laminated cell. The rated capacity of this battery was 20 mAh.

Initial conditioning was performed in the following conditions in an environment at 25° C.

First cycle: after being charged at 0.2 C for 1 hour, discharged to 3 V at 0.2 C Second cycle: after being charged to 4.1 V at 0.2 C, discharged to 3 V at 0.2 C Third cycle: after being charged at cccV to 4.2 V at 0.5 C (0.05 C current cut condition), discharged to 3 V at 0.2 C Fourth cycle: charged at cccV to 4.2 V at 0.5 C (0.05 C current cut condition)

("Charged at cccV" refers to a condition where charging is performed at a constant current for a certain amount, and then charging is performed at a constant voltage until the termination condition is satisfied)

Production of Graphite Particles

Physical properties of the graphite particles or the like used in the working examples and the comparative examples are shown in Table 1 below.

Note that the Si composite carbon particles (A), amorphous composite graphite particles (B), and natural graphite particles (D1) were produced as described below.

Si Composite Carbon Particles (A)

Polycrystalline Si having the d50 of 30 µm (manufactured by Wako) was pulverized to d50 of 0.2 µm with N-methyl-2-pyrrolidone (NMP) using a bead mill (Ashizawa Finetech Ltd.) to produce a Si slurry (1). To 750 g of NMP in which 60 g of polyacrylonitrile was uniformly dissolved, 500 g (solid content: 40%) of this Si slurry (1) was added and mixed using a mixing stirrer. Thereafter, 1000 g of flake natural graphite (d50: 45 µm) was added and mixed to obtain a slurry (II) in which the polyacrylonitrile, Si, and graphite are uniformly dispersed.

Drying was performed moderately at 150° C., which was not higher than the thermal decomposition temperature of polyacrylonitrile, under reduced pressure for 3 hours in a manner that the polyacrylonitrile was not modified from this slurry (II). Incidentally, the decomposition temperature of polyacrylonitrile by DSC analysis was 270° C. The agglomerates obtained were disaggregated with a hammer mill (MF10, manufactured by IKA) at a rotation speed of 6000 rpm. The disaggregated mixture was introduced into the Hybridization System (manufactured by Nara Machinery Co., Ltd.) and was allowed to circulate or retained in the device for 180 seconds at a rotor rotation speed of 7000 rpm to perform spheroidizing treatment, thereby making the Si particles embedded within the flake natural graphite. Thereafter, heat treatment was performed at 1000° C. in a nitrogen atmosphere for 1 hour to obtain the Si composite carbon particles (E).

Coal tar pitch was mixed to the Si composite carbon particles (E) in a manner that the coating proportion after the calcination became 7.5%, and kneaded and dispersed using a twin-screw kneader.

The obtained dispersion was introduced to a furnace to perform calcination at 1000° C. in a nitrogen atmosphere for 1 hour. The calcined agglomerates were disaggregated using a mill described above at a rotation speed of 3000 rpm, and then classified using a vibrating sieve having a sieve opening of 45 m to obtain the Si composite carbon particles (A) coated with the amorphous carbon (Si content: 8.2% by mass).

Furthermore, when the cross section structure was observed by the measurement method described above, the Si composite carbon particles (A) had a structure in which flake graphite was folded and the Si compound particles were present within the voids of the folded structure. Furthermore, the parts where the Si compound particles and the flake graphite were in contact were observed.

Amorphous Composite Graphite Particles (B)

For flake natural graphite having the d50 of 100 µm, spheroidizing treatment by mechanical action was performed using the Hybridization System NHS-1, manufactured by Nara Machinery Co., Ltd., at a rotor circumferential speed of 85 m/sec for 3 minutes. This sample was subjected to classification to obtain spheroidized graphite particles (C) having the d50 of 22.7 µm. The obtained spheroidized graphite particles (C) and coal tar pitch as an amorphous carbon precursor were mixed, and subjected to heat treatment at 1300° C. in an inert gas. Thereafter, the calcined material was subjected to disaggregation/classification to obtain amorphous composite graphite particles (B) in which the spheroidized graphite particles and the amorphous carbon were composited. From the proportion of the carbon residues, it was confirmed that the mass ratio of the spheroidized graphite particles to the amorphous carbon (spheroidized graphite particles:amorphous carbon) was 1:0.03 in the obtained amorphous composite graphite particles (B).

Natural Graphite Particles (D1)

The spheroidized graphite particles (C) used during the production of the amorphous composite graphite particles (B) were used as the natural graphite particles (D1).

Natural Graphite Particles (D2)

Flake natural graphite having the d50 of 9.8 μm was used as the natural graphite particles (D2).

MCMB

As the mesocarbon microbeads (MCMB), MCMB6-28 manufactured by Osaka Gas Chemicals Co., Ltd. was used.

Various physical properties of the raw materials described above are shown in Table 1.

TABLE 1

|  | d50 (μm) | SA ($m^2/g$) | Raman R value | Tap density ($g/cm^3$) | DBP oil absorption (ml) |
|---|---|---|---|---|---|
| Si composite carbon particles (A) | 13.6 | 16.4 | 0.54 | 1.05 | 54.7 |
| Amorphous composite graphite particles (B) | 21.7 | 2.2 | 0.34 | 1.14 | 42.5 |
| Natural graphite particles (D1) | 22.7 | 4.6 | 0.20 | 1.03 | 51.5 |
| Natural graphite particles (D2) | 9.8 | 7.66 | 0.15 | 0.69 | 78.6 |
| MCMB | 7.4 | 2.9 | 0.19 | 1.21 | 30.8 |

Working Example 1

The Si composite carbon particles (A) and the amorphous composite graphite particles (B) were mixed at Si composite carbon particles (A)/amorphous composite graphite particles (B)=70/30 (mass ratio) to form a carbon material for negative electrodes of non-aqueous secondary batteries. For this sample, initial discharge capacity, initial efficiency, input/output resistance, and discharge capacity maintenance ratio (cycle maintenance ratio) were measured by the measurement method described above. The results are shown in Table 2 below.

Working Example 2

The Si composite carbon particles (A) and the amorphous composite graphite particles (B) were mixed at Si composite carbon particles (A)/amorphous composite graphite particles (B)=50/50 (mass ratio) to form a carbon material for negative electrodes of non-aqueous secondary batteries. For this sample, initial discharge capacity, initial efficiency, input/output resistance, and discharge capacity maintenance ratio (cycle maintenance ratio) were measured by the measurement method described above. The results are shown in Table 2 below.

Working Example 3

The Si composite carbon particles (A) and the amorphous composite graphite particles (B) were mixed at Si composite carbon particles (A)/amorphous composite graphite particles (B)=30/70 (mass ratio) to form a carbon material for negative electrodes of non-aqueous secondary batteries. For this sample, initial discharge capacity, initial efficiency, input/output resistance, and discharge capacity maintenance ratio (cycle maintenance ratio) were measured by the measurement method described above. The results are shown in Table 2 below.

Working Example 4

The Si composite carbon particles (A), the amorphous composite graphite particles (B), and the natural graphite particles (D1) were mixed at Si composite carbon particles (A)/amorphous composite graphite particles (B)/natural graphite particles (D1)=50/35/15 (mass ratio) to form a carbon material for negative electrodes of non-aqueous secondary batteries. For this sample, initial discharge capacity, initial efficiency, input/output resistance, and discharge capacity maintenance ratio (cycle maintenance ratio) were measured by the measurement method described above. The results are shown in Table 2 below.

Working Example 5

The Si composite carbon particles (A), the amorphous composite graphite particles (B), and the natural graphite particles (D1) were mixed at Si composite carbon particles (A)/amorphous composite graphite particles (B)/natural graphite particles (D1)=30/49/21 (mass ratio) to form a carbon material for negative electrodes of non-aqueous secondary batteries. For this sample, initial discharge capacity, initial efficiency, input/output resistance, and discharge capacity maintenance ratio (cycle maintenance ratio) were measured by the measurement method described above. The results are shown in Table 2 below.

Comparative Example 1

The Si composite carbon particles (A) were used as a carbon material for negative electrodes of non-aqueous secondary batteries. For this sample, initial discharge capacity, initial efficiency, input/output resistance, and discharge capacity maintenance ratio (cycle maintenance ratio) were measured by the measurement method described above. The results are shown in Table 2 below.

Comparative Example 2

The amorphous composite graphite particles (B) were used as a carbon material for negative electrodes of non-aqueous secondary batteries. For this sample, initial discharge capacity, initial efficiency, input/output resistance, and discharge capacity maintenance ratio (cycle maintenance ratio) were measured by the measurement method described above. The results are shown in Table 2 below.

Comparative Example 3

The natural graphite particles (D1) were used as a carbon material for negative electrodes of non-aqueous secondary batteries. For this sample, initial discharge capacity, initial efficiency, input/output resistance, and discharge capacity maintenance ratio (cycle maintenance ratio) were measured by the measurement method described above. The results are shown in Table 2 below.

Comparative Example 4

The Si composite carbon particles (A) and the natural graphite particles (D2) were mixed at Si composite carbon particles (A)/natural graphite particles (D2)=70/30 (mass ratio) to form a carbon material for negative electrodes of non-aqueous secondary batteries. For this sample, initial discharge capacity, initial efficiency, input/output resistance, and discharge capacity maintenance ratio (cycle maintenance ratio) were measured by the measurement method described above. The results are shown in Table 2 below.

Comparative Example 5

The Si composite carbon particles (A) and the MCMB were mixed at Si composite carbon particles (A)/MCMB=70/30 (mass ratio) to form a carbon material for negative electrodes of non-aqueous secondary batteries. For this sample, initial discharge capacity, initial efficiency, input/output resistance, and discharge capacity maintenance ratio (cycle maintenance ratio) were measured by the measurement method described above. The results are shown in Table 2 below.

TABLE 2

|  | Initial discharge capacity (mAh) | Initial efficiency | Input/output resistance (Ω) | Discharge capacity maintenance ratio |
|---|---|---|---|---|
| Working Example 1 | 497 | 85% | 1.39 | 83% |
| Working Example 2 | 458 | 88% | 1.34 | 88% |
| Working Example 3 | 422 | 91% | 1.33 | 90% |
| Working Example 4 | 457 | 87% | 1.34 | 87% |
| Working Example 5 | 420 | 90% | 1.30 | 91% |
| Comparative Example 1 | 558 | 82% | 1.43 | 82% |
| Comparative Example 2 | 364 | 96% | 1.31 | 92% |
| Comparative Example 3 | 369 | 94% | 1.43 | 93% |
| Comparative Example 4 | 486 | 85% | 1.42 | 85% |
| Comparative Example 5 | 477 | 83% | 1.43 | 84% |

As is understood from Table 2, the carbon material for negative electrodes of non-aqueous secondary batteries containing the Si composite carbon particles (A) and the amorphous composite graphite particles (B) (Working Examples 1 to 5) had excellent balance in initial discharge capacity, initial efficiency, input/output resistance, and discharge capacity maintenance ratio, compared to those of Comparative Examples 1 to 5.

Furthermore, as shown in FIG. 1, it was found that the input/output resistance of the carbon material of the present invention containing the Si composite carbon particles (A) and the amorphous composite graphite panicles (B) was lower than the input/output resistance of a mixed material (broken line) that was estimated from the input/output resistances of the cases where the Si composite carbon panicles (A) or the amorphous composite graphite particles (B) was used alone. It is conceived that this is because the increase of overvoltage in the entire electrode was suppressed since the lithium transfer preferentially occurred in the amorphous composite graphite particles (B), in which transfer of lithium ion was even more facilitated.

Therefore, by using the carbon material for negative electrodes of non-aqueous secondary batteries of the present invention, a non-aqueous secondary battery having an initial discharge capacity, initial efficiency, input/output resistance, and discharge capacity maintenance ratio that are balanced at a high level can be provided.

The invention claimed is:

1. A carbon material for a negative electrode of a non-aqueous secondary battery, the carbon material comprising
    (1) composite carbon particles (A) containing elemental silicon, and
    (2) amorphous composite graphite particles (B) comprising graphite particles (C) and amorphous carbon,
    wherein the carbon material has an initial discharge capacity of from 420 to 497 mAh and an input/output resistance of from 1.30 to 1.39 Ω,
    wherein the dibutyl phthalate (DBP) oil absorption of the composite carbon particles (A) is 30 ml/100g to 65 ml/100g,
    wherein the mass proportion of the amorphous composite graphite particles (B) in the carbon material for a negative electrode of a non-aqueous secondary battery is greater than 0% by mass and 90% by mass or less, and
    wherein a Raman R value of the graphite particles (B) is from 0.2 to 0.6, wherein the Raman R value is an intensity ratio, $I_B/I_A$, an intensity $I_B$ of a maximum peak $P_B$ around 1360 cm-1 to an intensity $I_A$ of a maximum peak $P_A$ around 1580 cm-1 in a Raman spectrum.

2. The carbon material for a negative electrode of a non-aqueous secondary battery according to claim 1, the carbon material further comprising natural graphite particles (D).

3. The carbon material for a negative electrode of a non-aqueous secondary battery according to claim 1, wherein the graphite particles (C) are spheroidized natural graphite.

4. The carbon material for a negative electrode of a non-aqueous secondary battery according to claim 1, wherein the composite carbon particles (A) are composite carbon particles comprising at least one type of a Si compound selected from the group consisting of Si and SiOx, wherein 0<x<2.

5. The carbon material for a negative electrode of a non-aqueous secondary battery according to claim 2, wherein the composite carbon particles (A) are composite carbon particles comprising at least one type of Si compound selected from the group consisting of Si and SiOx, wherein 0<x<2.

6. The carbon material for a negative electrode of a non-aqueous secondary battery according to claim 3, wherein the composite carbon particles (A) are composite carbon particles comprising at least one type of Si compound selected from the group consisting of Si and SiOx, wherein 0<x<2.

7. A negative electrode for a non-aqueous secondary battery comprising a current collector and an active material layer on the current collector, wherein the active material layer comprises the carbon material according to claim 1.

8. A non-aqueous secondary battery comprising a positive electrode, the negative electrode according to claim 7, and an electrolyte.

9. The carbon material for a negative electrode of a non-aqueous secondary battery according to claim 1, wherein the carbon material further comprises 30-70% by mass of the composite carbon particles (A) containing elemental silicon.

10. The negative electrode for a non-aqueous secondary battery of claim 7, wherein the carbon material further comprises 30-70% by mass of the composite carbon particles (A) containing elemental silicon.

11. A carbon material for a negative electrode of a non-aqueous secondary battery, the carbon material consisting essentially of
   (1) composite carbon particles (A) containing elemental silicon dispersed within the carbon raw material, and
   (2) amorphous composite graphite particles (B) comprising graphite particles (C) and amorphous carbon,
   wherein the carbon material has an initial discharge capacity of from 420 to 497 mAh and an input/output resistance of from 1.30 to 1.39 Ω,
   wherein the dibutyl phthalate (DBP) oil absorption of the omposite carbon particle s A is 30 ml/100g to 65 ml/100g,
   wherein the mass proportion of the amorphous composite graphite particles (B) in the carbon material for a negative electrode of a non-aqueous secondary battery is greater than 0% by mass and 90% by mass or less, and
   wherein a Raman R value of the graphite particles (B) is from 0.2 to 0.6, wherein the Raman R value is an intensity ratio, $I_B/I_A$, of an intensity $I_B$ of a maximum peak $P_B$ around 1360 cm-1 to an intensity $I_A$ of a maximum peak $P_A$ around 1580 cm-1 in a Raman spectrum.

12. The carbon material for a negative electrode of a non-aqueous secondary battery according to claim 1, wherein the composite carbon particles (A) have an aspect ratio of 3 or less.

13. The carbon material for a negative electrode of a non-aqueous secondary battery according to claim 1, wherein the composite carbon particles (A) have a roundness of 0.88 or greater.

14. The carbon material for a negative electrode of a non-aqueous secondary battery according to claim 1, wherein the composite carbon particles (A) have doo2 of 0.3354 nm-0.337 nm, which is a spacing between 002 planes, determined by wide-angle X-ray diffraction.

15. The carbon material for a negative electrode of a non-aqueous secondary battery according to claim 1, wherein the composite carbon particles (A) have a crystallite size Lc of 50 nm or greater.

16. The carbon material for a negative electrode of a non-aqueous secondary battery according to claim 1, wherein the composite carbon particles (A) have a tap density of 0.6 g/cm³-1.2 g/cm³.

17. The carbon material for a negative electrode of a non-aqueous secondary battery according to claim 1, wherein the composite carbon particles (A) include element silicon of 0.5% by mass-30% by mass.

18. The carbon material for a negative electrode of a non-aqueous secondary battery according to claim 1, wherein the composite carbon particles (A) include element silicon at an abundance ratio of 0.3-1.2.

19. The carbon material for a negative electrode of a non-aqueous secondary battery according to claim 1, wherein the composite carbon particles (A) include a composite of Si compound particles and carbon raw material.

20. The carbon material for a negative electrode of a non-aqueous secondary battery according to claim 1, wherein the composite carbon particles (A) include Si compound particles embedded therein.

21. The carbon material for a negative electrode of a non-aqueous secondary battery according to claim 1, wherein the composite carbon particles (A) include Si compound particles dispersed within a spheroidized carbon raw material.

22. The carbon material for a negative electrode of a non-aqueous secondary battery according to claim 1, wherein the composite carbon particles (A) is made from natural graphite.

23. The carbon material for a negative electrode of a non-aqueous secondary battery according to claim 1, wherein the amorphous composite graphite particles (B) have an aspect ratio of 3 or less.

24. The carbon material for a negative electrode of a non-aqueous secondary battery according to claim 1, wherein the amorphous composite graphite particles (B) have a dibutyl phthalate oil absorption of 30 mL/100g-65 ml/100g.

25. The carbon material for a negative electrode of a non-aqueous secondary battery according to claim 1, wherein the Si composite carbon particles (A) are included at 20% by mass-80% by mass, and the amorphous composite graphite particles (B) are included at 20% by mass-80% by mass, with respect to a total mass of the carbon material.

26. The carbon material for a negative electrode of a non-aqueous secondary battery according to claim 1, wherein the Si composite carbon particles (A) are included at 30% by mass-70% by mass, and the amorphous composite graphite particles (B) are included at 30% by mass-70% by mass, with respect to a total mass of the carbon material.

27. The carbon material for a negative electrode of a non-aqueous secondary battery according to claim 1, which has d002 of 0.3354 nm-0.337 nm, which is a spacing between 002 planes, determined by wide-angle X-ray diffraction.

28. The carbon material for a negative electrode of a non-aqueous secondary battery according to claim 1, which has crystallite size Lc of 50 nm or greater.

29. The carbon material for a negative electrode of a non-aqueous secondary battery according to claim 1, which has an average particle diameter d50 of 5 μm-50 μm.

30. The carbon material for a negative electrode of a non-aqueous secondary battery according to claim 1, which has an aspect ratio of 3 or less.

31. The carbon material for a negative electrode of a non-aqueous secondary battery according to claim 1, which has a BET specific surface area of 1 m²/g-20 m²/g.

32. The carbon material for a negative electrode of a non-aqueous secondary battery according to claim 1, which has a roundness of 0.88 or greater.

33. The carbon material for a negative electrode of a non-aqueous secondary battery according to claim 1, which has Raman R of 0.1-0.8.

34. The carbon material for a negative electrode of a non-aqueous secondary battery according to claim 1, which has a tap density of 0.6g/cm³-1.8 g/cm³.

35. The carbon material for a negative electrode of a non-aqueous secondary battery according to claim 1, which has a dibutyl phthalate oil absorption of 30 mL/100g-65 ml/100g.

36. The carbon material for a negative electrode of a non-aqueous secondary battery according to claim 20, wherein the composite carbon particles (A) include Si compound particles dispersed within a spheroidized carbon raw material.

37. The carbon material for a negative electrode of a non-aqueous secondary battery according to claim 20, wherein the composite carbon particles (A) include element silicon at a content of 0.5% by mass-30% by mass.

38. The carbon material for a negative electrode of a non-aqueous secondary battery according to claim 21, wherein the composite carbon particles (A) include element silicon at a content of 0.5% by mass-30% by mass.

39. The carbon material for a negative electrode of a non-aqueous secondary battery according to claim 36, wherein the composite carbon particles (A) include element silicon at a content of 0.5% by mass-30% by mass.

40. The carbon material for a negative electrode of a non-aqueous secondary battery according to claim 11, wherein the composite carbon particles (A) include Si compound particles embedded therein.

41. The carbon material for a negative electrode of a non-aqueous secondary battery according to claim 11, wherein the composite carbon particles (A) include Si compound particles dispersed within a spheroidized carbon raw material.

42. The carbon material for a negative electrode of a non-aqueous secondary battery according to claim 41, wherein the composite carbon particles (A) include Si compound particles embedded therein.

43. The carbon material for a negative electrode of a non-aqueous secondary battery according to claim 40, wherein the composite carbon particles (A) include element silicon at a content of 0.5% by mass-30% by mass.

44. The carbon material for a negative electrode of a non-aqueous secondary battery according to claim 41, wherein the composite carbon particles (A) include element silicon at a content of 0.5% by mass-30% by mass.

45. The carbon material for a negative electrode of a non-aqueous secondary battery according to claim 42, wherein the composite carbon particles (A) include element silicon at a content of 0.5% by mass-30% by mass.

46. The carbon material for a negative electrode of a non-aqueous secondary battery according to claim 11, wherein the composite carbon particles (A) are included at 20% by mass-80% by mass, and the amorphous composite graphite particles (B) are included at 20% by mass-80% by mass, with respect to a total mass of the carbon material.

47. The carbon material for a negative electrode of a non-aqueous secondary battery according to claim 11, wherein the Si composite carbon particles (A) are included at 30% by mass-70% by mass, and the amorphous composite graphite particles (B) are included at 30% by mass-70% by mass, with respect to a total mass of the carbon material.

* * * * *